US009280397B2

(12) United States Patent
Adl-Tabatabai et al.

(10) Patent No.: US 9,280,397 B2
(45) Date of Patent: *Mar. 8, 2016

(54) USING BUFFERED STORES OR MONITORING TO FILTER REDUNDANT TRANSACTIONAL ACCESSES AND MECHANISMS FOR MAPPING DATA TO BUFFERED METADATA

(75) Inventors: Ali-Reza Adl-Tabatabai, San Jose, CA (US); Gad Sheaffer, Haifa (IL); Bratin Saha, Santa Clara, CA (US); Jan Gray, Bellevue, WA (US); David Callahan, Seattle, WA (US); Burton Smith, Seattle, WA (US); Graefe Goetz, Madison, WI (US)

(73) Assignee: Intel Corporation, Santa Clara, CA (US)

( * ) Notice: Subject to any disclaimer, the term of this patent is extended or adjusted under 35 U.S.C. 154(b) by 707 days.

This patent is subject to a terminal disclaimer.

(21) Appl. No.: 12/638,098

(22) Filed: Dec. 15, 2009

(65) Prior Publication Data
US 2011/0145516 A1 Jun. 16, 2011

Related U.S. Application Data

(63) Continuation-in-part of application No. 11/769,094, filed on Jun. 27, 2007, now Pat. No. 8,140,773.

(51) Int. Cl.
*G06F 12/00* (2006.01)
*G06F 9/52* (2006.01)
(Continued)

(52) U.S. Cl.
CPC ............... *G06F 9/522* (2013.01); *G06F 8/458* (2013.01); *G06F 9/52* (2013.01); *G06F 11/3471* (2013.01); *G06F 2201/865* (2013.01); *G06F 2201/87* (2013.01)

(58) Field of Classification Search
CPC ........................................................ G06F 9/52
USPC .......................................................... 711/141
See application file for complete search history.

(56) References Cited

U.S. PATENT DOCUMENTS 7,502,897 B2 3/2009 Hertzberg et al.
7,542,977 B2 6/2009 Hudson et al.
(Continued)

OTHER PUBLICATIONS

Ananiam, C. S., et al., "Unbounded Transactional Memory", 11th International Symposium on High-Performance Computer Architecture, 2005., HPCA-11,(Feb. 12-16, 2005).
(Continued)

*Primary Examiner* — Kalpit Parikh
(74) *Attorney, Agent, or Firm* — Grossman, Tucker, Perreault & Pfleger, PLLC

(57) ABSTRACT

A method and apparatus for accelerating a Software Transactional Memory (STM) system is herein described. A data object and metadata for the data object may each be associated with a filter, such as a hardware monitor or ephemerally held filter information. The filter is in a first, default state when no access, such as a read, from the data object has occurred during a pendancy of a transaction. Upon encountering a first access to the metadata, such as a first read, access barrier operations, such as logging of the metadata; setting a read monitor; or updating ephemeral filter information with an ephemeral/buffered store operation, are performed. Upon a subsequent/redundant access to the metadata, such as a second read, access barrier operations are elided to accelerate the subsequent access based on the filter being set to the second state to indicate a previous access occurred. Additionally, mapping of data objects to ephemeral information may be provided by software, such as through a pointer to the ephemeral information associated with the data object; an offset from a base address of the data object to the ephemeral information included associated with the data object; an index into a segment containing the ephemeral information associated with the data object; mapping the data object to the ephemeral information utilizing address arithmetic; and a hash that maps the data object to ephemeral information.

56 Claims, 6 Drawing Sheets

(51) Int. Cl.
*G06F 9/45* (2006.01)
*G06F 11/34* (2006.01)

(56) References Cited

U.S. PATENT DOCUMENTS

| | | | |
|---|---|---|---|
| 8,140,773 B2 | 3/2012 | Saha et al. | |
| 8,838,908 B2 | 9/2014 | Saha et al. | |
| 2002/0144061 A1* | 10/2002 | Faanes et al. | 711/126 |
| 2004/0162948 A1* | 8/2004 | Tremblay et al. | 711/137 |
| 2006/0085588 A1 | 4/2006 | Rajwar et al. | |
| 2006/0085591 A1 | 4/2006 | Kumar et al. | |
| 2006/0161740 A1 | 7/2006 | Kottapalli et al. | |
| 2007/0136289 A1 | 6/2007 | Adl-Tabatabai | |
| 2007/0143287 A1 | 6/2007 | Adl-tabatabai | |
| 2007/0143741 A1 | 6/2007 | Harris | |
| 2007/0143755 A1 | 6/2007 | Sahu et al. | |
| 2007/0156780 A1 | 7/2007 | Saha et al. | |
| 2007/0156994 A1 | 7/2007 | Akkary et al. | |
| 2007/0186056 A1 | 8/2007 | Saha et al. | |
| 2007/0198792 A1* | 8/2007 | Dice et al. | 711/163 |
| 2007/0198979 A1 | 8/2007 | Dice et al. | |
| 2007/0260608 A1 | 11/2007 | Hertzberg et al. | |
| 2007/0300238 A1 | 12/2007 | Kontothanassis et al. | |
| 2008/0005504 A1 | 1/2008 | Barnes et al. | |
| 2008/0040551 A1 | 2/2008 | Gray et al. | |
| 2008/0065864 A1 | 3/2008 | Akkary et al. | |
| 2008/0162881 A1 | 7/2008 | Welc | |
| 2008/0162885 A1 | 7/2008 | Wang et al. | |
| 2008/0162886 A1 | 7/2008 | Saha et al. | |
| 2008/0162990 A1 | 7/2008 | Wang et al. | |
| 2008/0163220 A1 | 7/2008 | Wang et al. | |
| 2008/0270745 A1 | 10/2008 | Saha et al. | |

OTHER PUBLICATIONS

Herlihy, M. et al., "Software Transactional Memory for Dynamic-Sized Data Structures", PODC, (2003).
Rajwar, et al., "Virtualizing Transactional Memory", In Proc. of the 32nd Annual Intl. symp. on Computer Architecture, Jun. 2005, 12 pages.
Kevin, et al., "LogTM: Log-based Transactional Memory", HPCA 2006,, pp. 1-12.
Fraser, et al., "Concurrent Programming without Locks", ACM Transactions on Computer Systems, vol. 25, No. 2, Article 5, May 2007, 62 pages.
Marathe, et al., "Adaptive Software Transactional Memory", In Proceedings of the Nineteenth International Symposium on Distributed Computing, 2005, 15 pages.
Harris, et al., "Optimizing Memory Transactions", In Proceeding of Conference on Programming Language Design and Implementation, 2006, 12 pages.
Berenson, et al., "A critique of ANSI SQL isolation levels", In Proceedings of SIGMOD, 1995, pp. 1-10.
Riegel, et al., "Snapshot Isolation for Software Transactional Memory", TRANSACT, 2006, 10 pages.
Saha, et al., "Implementing a High Performance Software Transactional Memory for a Multi-core Runtime", Proceedings of the eleventh ACM SIGPLAN symposium on Principles and practice of parallel programming, 2006.
Shavit, et al., "Software Transactional Memory", Proceedings of the Fourteenth ACM SIGACT-SIGOPS Symposium on Principles of Distributed Computing.
Harris, et al., "Language Support for Lightweight Transactions", Proceedings of the 2003 ACM SIGPLAN Conference on Object-Oriented Programming Systems, 15 pages.
Tabatabai, "Compiler and runtime support for efficient software transactional memory", Proceedings of the 2006 ACM SIGPLAN conference on Programming language design and implementation.
Harris, et al., "Composable memory transactions", Proceedings of the tenth ACM SIGPLAN symposium on Principles and practice of parallel programming, (2005).

* cited by examiner

USING BUFFERED STORES OR MONITORING TO FILTER REDUNDANT TRANSACTIONAL ACCESSES AND MECHANISMS FOR MAPPING DATA TO BUFFERED METADATA

The present patent application is a Continuation-in-Part of U.S. patent application Ser. No. 11/769,094, filed Jun. 27, 2007 now U.S. Pat. No. 8,140,773.

FIELD

This invention relates to the field of processor execution and, in particular, to processor mechanisms for synchronizing access to data.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of cores or logical processors.

The ever increasing number of cores and logical processors on integrated circuits enables more software threads to be concurrently executed. However, the increase in the number of software threads that may be executed simultaneously have created problems with synchronizing data shared among the software threads. One common solution to accessing shared data in multiple core or multiple logical processor systems comprises the use of locks to guarantee mutual exclusion across multiple accesses to the shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. However, this increases programming complexity, as programmers have to account for more locks within a hash table.

Another data synchronization technique includes the use of transactional memory (TM). Often transactional execution includes speculatively executing a grouping of a plurality of micro-operations, operations, or instructions. In the example above, both threads execute within the hash table, and their accesses are monitored/tracked. If both threads access/alter the same entry, one of the transactions may be aborted to resolve the conflict. One type of transactional execution includes a Software Transactional Memory (STM), where accesses are tracked, conflict resolution is performed, abort tasks are handled, and other transactional tasks are performed in software.

However, the overhead included in performing all of these tasks exclusively in software is potentially expensive. For example, in one implementation of an STM, a load operation in a transaction is logged for validation upon commitment of the transaction. However, subsequent reads to the same location may also be redundantly logged, which potentially wastes execution cycles within a transaction.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific hardware support for transactional execution, specific types of metadata, specific pseudo code for filtering data/metadata, specific types of memory accesses and locations, specific type of Software Transactional Memory (STM)s, specific transactional access barrier operations etc. in order to provide a thorough understanding of the present invention. It will be apparent, however, to one skilled in the art that these specific details need not be employed to practice the present invention. In other instances, well known components or methods, such as coding of transactions in software, demarcation of transactions, specific multi-core and multi-threaded processor architectures, interrupt generation/handling, cache organizations, cache coherency states, cache control logic, and specific operational details of microprocessors, have not been described in detail in order to avoid unnecessarily obscuring the present invention.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. However, other representations of values in computer systems have been used. For example the decimal number 10 may also be as a binary value of 1010 and a hexadecimal letter A.

Moreover, states may be represented by values or portions of values. As an example, a locked state may be represented by a first value in a location, such as an odd number, while a version number, such as an even value, in the location represents an unlocked state. Here, a portion of the first and second value may be used to represent the states, such as two lower bits of the values, a sign bit associated with the values, or other portion of the values.

The method and apparatus described herein are for accelerating a software transactional memory (STM) system. Specifically, accelerating a software transactional memory (STM) system is primarily discussed in reference to filtering redundant transactional operations in a multi-core microprocessor. However, the methods and apparatus for accelerating a software transactional memory (STM) are not so limited, as they may be implemented on or in association with any integrated circuit device or system, such as cell phones, personal digital assistants, embedded controllers, mobile platforms, desktop platforms, and server platforms, as well as in conjunction with other resources, such as hardware/software threads, that utilize transactional memory.

Figure 1:
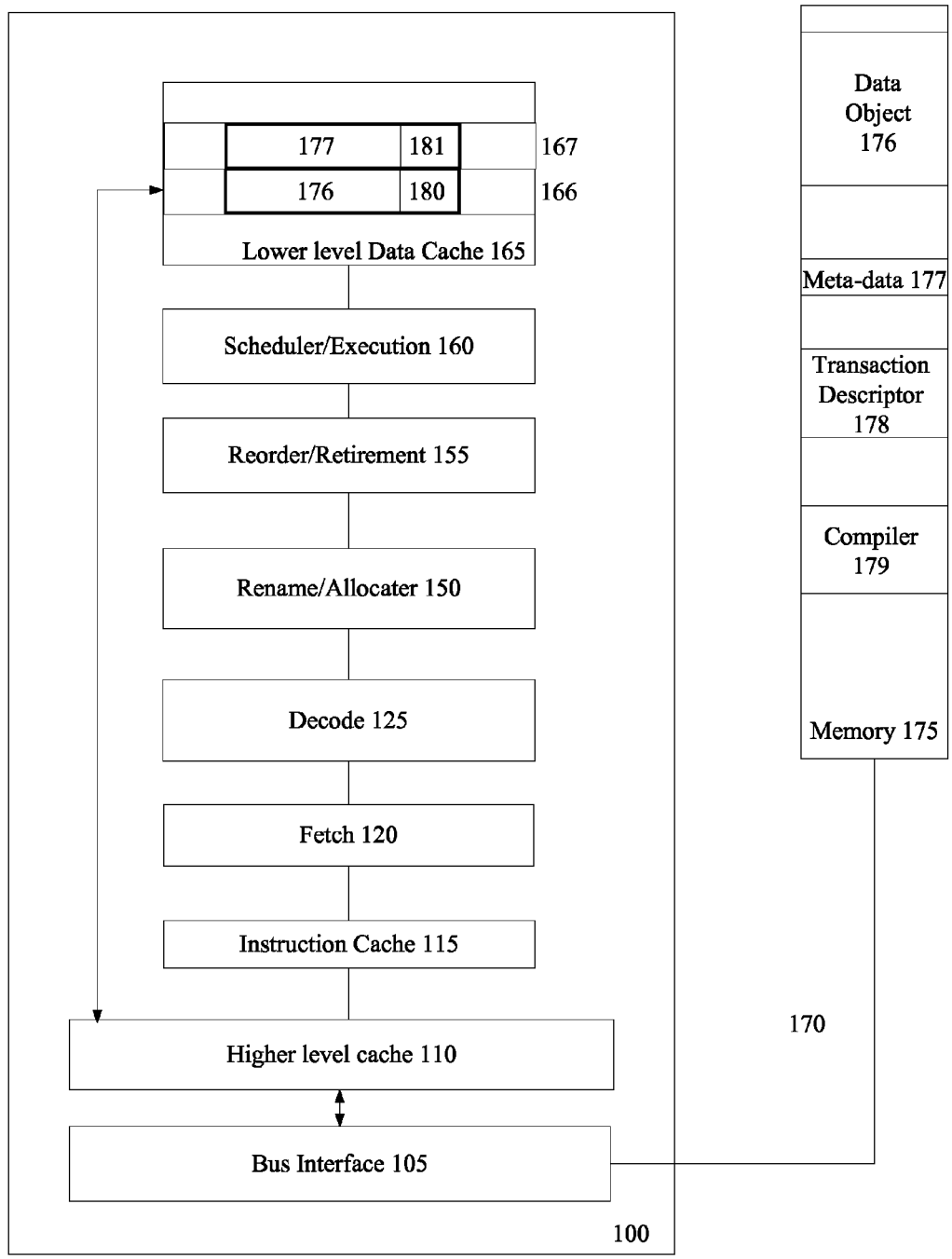
FIG. 1 illustrates an embodiment of a system capable of accelerating barriers for transactional accesses in a software transactional memory (STM) system.

Referring to FIG. 1, an embodiment of a processor capable of accelerating a software transactional memory (STM) system is illustrated. In one embodiment, processor 100 is a multi-core processor capable of executing multiple threads in parallel. However processor 100 may include any processing element, such as an embedded processor, cell-processor, microprocessor, or other known processor, which is capable of executing one thread or multiple threads. As an illustrative example, a simplified embodiment of an out-of-order architecture for a processor is illustrated in FIG. 1.

The modules shown in processor 100, which are discussed in more detail below, are potentially implemented in hardware, software, firmware, or a combination thereof. Note that the illustrated modules are logical blocks, which may physically overlap the boundaries of other modules, and may be configured or interconnected in any manner. In addition, the modules as shown in FIG. 1 are not required in processor 100. Furthermore, other modules, units, and known processor features may also be included in processor 100.

Bus interface module 105 is to communicate with a device, such as system memory 175, a chipset, a north bridge, or other integrated circuit. Typically bus interface module 105 includes input/output (I/O) buffers to transmit and receive bus signals on interconnect 170. Examples of interconnect 170 include a Gunning Transceiver Logic (GTL) bus, a GTL+bus, a double data rate (DDR) bus, a pumped bus, a differential bus, a cache coherent bus, a point-to-point bus, a serial interconnect, a multi-drop bus or other known interconnect implementing any known bus protocol.

Processor 100 is coupled to memory 175, which may be dedicated to processor 100 or shared with other devices in a system. Examples of memory 175 includes dynamic random access memory (DRAM), static RAM (SRAM), non-volatile memory (NV memory), and long-term storage. Bus interface unit 105 as shown is also to communicate with higher level cache 110.

Higher-level cache 110 is to cache recently fetched and/or operated on elements. In one embodiment, higher-level cache 110 is a second-level data cache. However, higher level cache 110 is not so limited, as it may be or include instruction cache 115 to store recently fetched/decoded instructions. Instruction cache 115 is illustrated before fetch logic 120 and decode logic 125. Here, instruction cache 115 stores recently fetched instructions that have not been decoded. Yet, instruction cache 115 is potentially placed after fetch logic 120 and/or after decode logic 125 to store decoded instructions. In fact, a specific type of instruction cache, a trace cache, to store recently decoded traces.

Fetch logic 120 is to fetch data/instructions to be operated on/executed. Although not shown, in one embodiment, fetch logic includes or is associated with branch prediction logic, a branch target buffer, and/or a prefetcher to predict branches to be executed/taken and pre-fetch instructions along a predicted branch for execution. Here, a processor capable of speculative execution potentially prefetches and speculatively executes predicted branches. Decode logic 125 is coupled to fetch logic 120 to decode fetched elements. Decode logic 125 typically includes decoders that recognize and decode instructions that are part of an Instruction Set Architecture (ISA) for processor 100. Essentially, an ISA includes a specification of the set of opcodes (machine language)—the native commands—implemented by a particular processor, such as processor 100. As a result, the decoders recognize these opcodes and decode the instructions for later processing by the microarchitecture of processor 100.

Allocator and renamer module 150 includes an allocator to reserve resources, such as register files to store instruction processing results and a reorder buffer to track instructions. Unit 150 may also include a register renamer to rename program/instruction reference registers to other registers internal to processor 100. Reorder/retirement module 155 includes components, such as the reorder buffers mentioned above, to support out-of-order execution and later retirement of instructions executed out-of-order. In one embodiment, where processor 100 is an in-order execution processor, reorder/retirement module 155 may not be included.

Scheduler and execution module 160, in one embodiment, includes a scheduler unit to schedule instructions/operations on execution units. Register files associated with execution units are also included to store information instruction processing results. Exemplary execution units include a floating point execution unit, an integer execution unit, a jump execution unit, a load execution unit, a store execution unit, and other known execution units.

Also shown in FIG. 1 is lower level data cache 165. Data cache 165 is to store recently used/operated on elements, such as data operands. In one embodiment, a data translation lookaside buffer (DTLB) is associated with lower level data cache 165. Often a processor logically views physical memory as a virtual memory space. As a specific example, a processor may include a page table structure to break physical memory into a plurality of virtual pages. Here, a DTLB supports translation of virtual to linear/physical addresses. Data cache 165 may be utilized as a transactional memory or other memory to track tentative accesses during execution of a transaction, as discussed in more detail below. Furthermore, structures or support within caches, such as cache 165, may be utilized to accelerate STMs, which is also discussed in more detail below.

In one embodiment, processor 100 is a multi-core processor. A core often refers to any logic located on an integrated circuit capable of maintaining an independent architectural state, wherein each independently maintained architectural state is associated with at least some dedicated execution resources. In one embodiment, execution resources, such as execution module 160, include physically separate execution units dedicated to each core. However, execution module 160 may include execution units that are physically arranged as part of the same unit or in close proximity; yet, portions of execution module 160 are logically dedicated to each core. Furthermore, each core may share access to processor resources, such as higher level cache 110.

In another embodiment, processor 100 includes a plurality of hardware threads, which may also be referred to as a plurality of hardware thread slots. A hardware thread typically refers to any logic located on an integrated circuit capable of maintaining an independent architectural state, wherein the independently maintained architectural states share access to some execution resources. For example, smaller resources, such as instruction pointers, renaming logic in rename allocater logic 150, an instruction translation buffer (ILTB) may be replicated for each hardware thread, while, resources, such as re-order buffers in reorder/retirement unit 155, load/store buffers, and queues may be shared by hardware threads through partitioning. Other resources, such as low-level data-cache and data-TLB 165, execution unit(s) 160, and parts of out-of-order unit 155 are potentially fully shared.

As certain processing resources are shared and others are dedicated to an architectural state, the line between the nomenclature of a hardware thread and core overlaps. Yet often, a core and a hardware thread are viewed by an operating system as individual logical processors, with each logical processor being capable of executing a software thread of execution. Logical processors, such as the aforementioned cores, threads, etc., may also be referred to herein as processing elements. Therefore, a processor, such as processor 100, is capable of executing multiple threads on multiple logical processors/processing elements. Consequently, multiple transactions may be simultaneously and/or concurrently executed—simultaneous multithreading—in processor 100. Often, current processor decoders decode an instruction into multiple operations or micro-operations (micro-ops); however, in some architectures a single instruction may be to perform a single operation.

In one embodiment, processor 100 is capable of hardware transactional execution, software transactional execution, or a combination/hybrid thereof. A transaction, which may also be referred to as a critical or atomic section of code, includes a grouping of instructions or operations to be executed as an atomic group. For example, instructions or operations may be used to demarcate a transaction or a critical section. In one embodiment, as described above, these instructions are part of a set of instructions, such as an Instruction Set Architecture (ISA), which are recognizable by hardware of processor 100. Often, these instructions, once compiled from a high-level language to hardware recognizable assembly language include operation codes (opcodes), or other portions of the instructions, that decoders recognize during a decode stage.

Typically, during execution of a transaction, updates to memory are not made globally visible until the transaction is committed. As an example, a transactional write to a location is potentially visible to a local thread; yet, in response to a read from another thread the write data is not forwarded until the transaction including the transactional write is committed. While the transaction is still pending, data items/elements loaded from and written to within a memory are tracked, as discussed in more detail below. Once the transaction reaches a commit point, if conflicts have not been detected for the transaction, then the transaction is committed and updates made during the transaction are made globally visible.

However, if the transaction is invalidated during its pendency, the transaction is aborted and potentially restarted without making the updates globally visible. As a result, pendency of a transaction, as used herein, refers to a transaction that has begun execution and has not been committed or aborted, i.e. pending.

A Software Transactional Memory (STM) system often refers to performing access tracking, conflict resolution, or other transactional memory tasks within, or at least partially within, software. In one embodiment, processor 100 is capable of executing a compiler, such as compiler 179, to compile program code to support transactional execution. Here, the compiler may insert operations, calls, functions, and other code to enable execution of transactions.

Compiler 179 often includes a program or set of programs to translate source text/code into target text/code. Usually, compilation of program/application code with compiler 179 is done in multiple phases and passes to transform hi-level programming language code into low-level machine or assembly language code. Yet, single pass compilers may still be utilized for simple compilation. Compiler 179 may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle end, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts transactional operations, calls, functions, etc. in one or more phases of compilation, such as insertion of calls/operations in a front-end phase of compilation and then transformation of the calls/operations into lower-level code during a transactional memory transformation phase.

Nevertheless, despite the execution environment and dynamic or static nature of a compiler, compiler 179, in one embodiment, compiles program code to enable transactional execution. Therefore, reference to execution of program code, in one embodiment, refers to: (1) execution of a compiler program(s), either dynamically or statically, to compile main program code, to maintain transactional structures, or to perform other transaction related operations; (2) execution of main, compiled program code including transactional operations/calls; (3) execution of other program code, such as libraries, associated with the main program code or provided separately from main program code; or (4) a combination thereof.

Often within software transactional memory (STM) systems, compiler 179 is utilized to insert operations, calls, and other code inline with application code to be compiled, while other operations, calls, functions, and code are provided separately within libraries. This potentially provides the ability of the libraries distributors to optimize and update the libraries without having to recompile the application code. As a specific example, a call to a barrier function may be inserted inline within application code at an access within a transaction, while the barrier function is separately provided in an updateable library. Additionally, the choice of where to place specific operations and calls potentially affects the efficiency of application code. For example, if a filter operation, which is discussed in more detail below, is inserted inline with code, the filter operation may be performed before vectoring execution to a barrier instead of vectoring to the barrier and then performing the filter operation. Alternatively, a filter operation may be inserted in an access barrier within a library, such that control flow follows the call to the access barrier but filters an access barrier operation based on the filter operation.

In one embodiment, processor 100 is capable of executing transactions utilizing hardware/logic, i.e. within a Hardware Transactional Memory (HTM) system, and/or utilizing features of hardware to accelerate an STM. Numerous specific implementation details exist both from an architectural and microarchitectural perspective when implementing transactional memory hardware; most of which are not discussed herein to avoid unnecessarily obscuring the discussion. However, some structures and implementations are disclosed for illustrative purposes. Yet, it should be noted that these structures and implementations are not required and may be augmented and/or replaced with other structures having different implementation details.

As a combination, processor 100 may be capable of executing transactions within an unbounded transactional memory (UTM) system or hybrid transactional memory system, which attempts to take advantage of the benefits of both STM and HTM systems. For example, an HTM is often fast and efficient for executing small transactions, because it does not rely on software to perform all of the access tracking, conflict detection, validation, and commit for transactions. However, HTMs are usually only able to handle smaller transactions, while STMs are able to handle unbounded sized transactions. Therefore, in one embodiment, a UTM system utilizes hardware to execute smaller transactions and software to execute transactions that are too big for the hardware. Here, the underlying hardware, one again, may be utilized to accelerate the Software transactional Memory (STM) system. Therefore, even when software is handling transactions, hardware may be utilized to assist and accelerate the software. Furthermore, it's important to note that the same hardware may also be utilized to support and accelerate a pure STM system.

As stated above, transactions include transactional memory accesses to data items, such as data object 176, both by local processing elements within processor 100, as well as potentially by other processing elements. Without safety mechanisms in a transactional memory system, some of these accesses would potentially result in invalid data and execution, i.e. a write to data invalidating a read or a read of invalid data. As a result, processor 100 potentially includes logic to track or monitor memory accesses to and from data items for identification of potential conflicts, such as read monitors and write monitors, as discussed below.

A data object, data item or data element may include data at any granularity level, as defined by hardware, software or a combination thereof. A non-exhaustive list of examples of data, data objects, data elements, data items, or references thereto, include: a memory address, a data object, a class, a field of a type of dynamic language code, a type of dynamic language code, a variable, an operand, a data structure, and an indirect reference to a memory address. However, any known grouping of data may be referred to as a data element, object, or item. A few of the examples above, such as a field of a type of dynamic language code and a type of dynamic language code refer to data structures of dynamic language code. To illustrate, dynamic language code, such as Java™ from Sun Microsystems, Inc, is a strongly typed language. Each variable has a type that is known at compile time. The types are divided in two categories—primitive types (boolean and numeric, e.g., int, float) and reference types (classes, interfaces and arrays). The values of reference types are references to objects. In Java™, an object, which consists of fields, may be a class instance or an array. Given object a of class A it is customary to use the notation A::x to refer to the field x of type A and a.x to the field x of object a of class A. For example, an expression may be couched as a.x=a.y+a.z. Here, field y and field z are loaded to be added and the result is to be written to field x.

Therefore, monitoring/buffering memory accesses, in software or hardware, to data items may be performed at any of data level granularity. For example, in one embodiment, memory accesses to data are monitored at a type level. Here, a transactional write to a field A::x and a non-transactional load of field A::y may be monitored as accesses to the same data item, i.e. type A. In another embodiment, memory access monitoring/buffering is performed at a field level granularity. Here, a transactional write to A::x and a non-transactional load of A::y are not monitored as accesses to the same data item, as they are references to separate fields. Note, other data structures or programming techniques may be taken into account in tracking memory accesses to data items. As an example, assume that fields x and y of object of class A, i.e. A::x and A::y, point to objects of class B, are initialized to newly allocated objects, and are never written to after initialization. In one embodiment, a transactional write to a field B::z of an object pointed to by A::x are not monitored as memory access to the same data item in regards to a non-transactional load of field B::z of an object pointed to by A::y. Extrapolating from these examples, it is possible to determine that monitors may perform monitoring/buffering at any data granularity level.

In one embodiment, processor 100 is capable of filtering transactional access barrier operations, which potentially results in the acceleration of access barrier execution. And, as a corollary, the acceleration of access barriers potentially results in more efficient transactional execution. As an example, upon subsequent, redundant transactional accesses; access barrier operations, which have already been performed and are extraneous, are omitted. Any known method of identifying such redundant accesses may be utilized. Specifically, any hardware or software structure capable of indicating that a pervious access has been performed upon a subsequent, redundant access may be utilized. However, to provide a more thorough exemplary discussion, two types of filtering mechanisms—access monitoring and buffered updates—are described herein; both of which may be applied to different information—data and metadata.

As a result, four potential scenarios are described in more detail within, even though they are only intended to be exemplary and not limiting in any manner. The first scenario includes utilizing hardware monitoring to filter access barriers associated with data. Here, some hardware structure, such as monitors associated with cache memory 165, are utilized to track transactional access—transactional reads and writes—to data, such as data object 176. When data object 176 is read or written, associated monitors (not pictured) are updated, accordingly, to indicate the read or write has occurred. Upon a subsequent access to data object 176, the monitors are checked. And, if the monitors indicate a previous access, then extraneous access barrier operations may be elided. For example, upon a subsequent read to data object 176 as indicated by an associated read monitor, then a read barrier operation, such as logging of a version value associated with data object 176 in a local, transactional read set is omitted.

The second scenario utilizes similar filtering based on hardware monitors. But, in the second scenario, monitoring and filtering is performed for accesses to metadata 177 associated with data object 176. Here, monitors (not pictured) track accesses to metadata 177, such as a transaction record or transactional, software-maintained lock. Upon subsequent accesses to the metadata 177, access barrier operations for metadata 177 are omitted. Just as the example above, upon a subsequent, redundant read of metadata 177, an access barrier operation, such as logging a version of a data object held as metadata 177 is elided. However, depending on how metadata 177 is associated with the data object, which embodiments of are described in more detail below, filtering on metadata 177 may be more efficient and potentially advantageous when compared to filtering on data.

Different from monitoring accesses to data or metadata, scenarios three and four are in regard to buffering monitor/filter values to perform similar filtering to either data 176, metadata 177, or both. With filtering based on monitors, processor 100 is outfitted with hardware monitors to perform access tracking. However, software may be able to obtain similar functionality, with or without hardware monitors, utilizing memory that supports buffered stores. Buffered, or ephemeral stores, in one embodiment, refer to a private store to a cache line, such that a local thread is able to read and write the private store data. But other, global threads are not able to read and write the tentative, private data. Buffered stores are discussed in more detail below. Yet, in operation, filter fields 180, 181 held within cache memory 165 may be associated with data 176 and metadata 177, respectively. Upon an access to the metadata 177, program code includes a buffered store operation, when executed, to update filter field 181, accordingly. As a result, upon a subsequent transactional access private, filter field 181 is checked. If filter field 181 indicates a previous access, then access barrier operations may be omitted in a similar manner as to that described above.

Additionally, filter filed 180 operates in a similar manner for filtering data 176. Essentially, the ephemerally held filter fields 180, 181 operate as privately held monitors, which are local, private data to a thread and are not visible globally. Note that these four scenarios have been discussed as non-limiting examples, which may be implemented separately or in conjunction with one another. Therefore, just in the aforementioned examples, there are sixteen possible implementations that combine monitoring or buffering on data or metadata in any manner. Yet, regardless of the hardware and software mechanisms, in one embodiment, access barrier operations are filtered based on whether they are extraneous with regard to earlier accesses.

Figure 2:
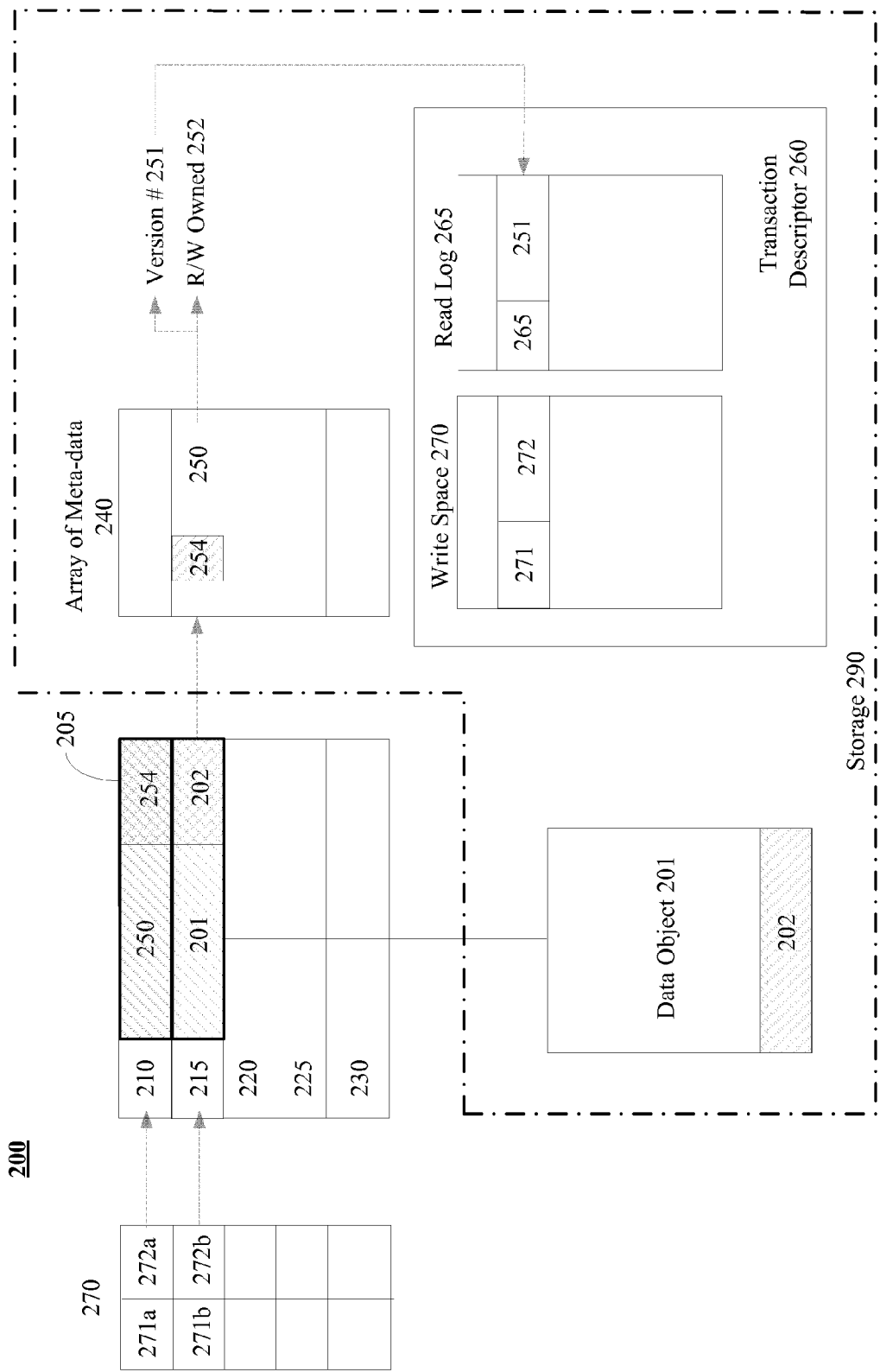
FIG. 2 illustrates embodiments of a system capable of accelerating barriers for transactional accesses in a software transactional memory (STM) system.

Referring to FIG. 2, multiple embodiments of hardware and software mechanisms to filter access barriers for data and metadata are illustrated. Data object 201 includes any granularity of data, such as a word, a data element/operand, an instruction, a line of memory, a cache line, a programming language defined object, a field of a programming language defined object, a table, a hash table, or any other known data structure or object. For example, a programming language defined data object, such as a table, is data object 201.

As shown, data object 201 includes filter field 202; however, filter field 202 may be associated with data object 201 in any manner, such as appended to data object 201. In one embodiment, an address referencing data object 201 is hashed to index an array of filter fields including filter field 202. In another embodiment, data object 201 includes a pointer to filter field 202. As yet another example, a filter field may be part of metadata associated with a data object, such as filter field 254 associated with metadata 250. Filter fields 202, 254 may be persistent data—exists throughout the memory hierarchy; however, in other embodiments filter fields 202, 254 may not persist throughout a memory hierarchy. Instead, in the later case, filter fields 202, 254 may exists as private, buffered constructs within memory 205 that are not visible to non-local threads and other, higher-level memories.

Memory 205 includes any memory to store elements associated with transactions. Here, transactional memory 205 comprises plurality of lines 210, 215, 220, 225, and 230. In one embodiment, memory 205 is a cache memory. As an example, data object 201 is to be stored aligned in cache line 215. Alternatively, data object 201, as shown, is capable of being stored unaligned in memory 205. Here, data object 201, including filter field 202, is included within cache line 215. As stated above, even when filter field 202 is not included within data object held at its home memory location—storage 290, which may includes a shared, system memory—filter field 202 may be privately held within cache line 215 in a buffered state, as described in more detail below. Note that a data object may span multiple cache lines within one or more of those cache lines being held in a buffered state to maintain ephemeral filter fields/information. Data object 201 includes any arbitrary size, such as a size smaller than a cache line (i.e. multiple elements per cache line), a size of a cache line, or a size larger than a cache line (i.e. multiple cache lines per element).

In one example, each data object is associated with a metadata location in array of metadata 240. As an illustrative embodiment, an address associated with cache line 215, or directly with data object 201, is hashed to index array 240, which associates metadata location 250 with cache line 215 and data object 201. However, metadata location 250 may be associated with data object 201 and/or cache line 215 in any manner. For example, metadata 250 may also be part of object 201. Mapping of data to ephemeral information, such as metadata, is also discussed in more detail below.

In one embodiment, metadata location 250 includes a transaction record or transactional lock that represents whether data object 201 is transactionally locked or available. In one embodiment, when data object 201 is locked, metadata location 250 includes a locked value to represent a locked state, such as read/write owned state 252. Some examples of values held in metadata 240 to indicate a locked state include: a pointer or reference to transaction descriptor 260 for a transaction owning the lock; a pointer or reference to write set 270 for a transaction owning the lock; and a generic value with specific bits, such as the two least significant bits, set to a locked value. Yet, any lock or lock state may be utilized and represented in metadata location 250. When unlocked, or available, metadata location 250 includes an unlocked value. In one embodiment, the unlocked value is to represent version number 251. Here, version number 251 is updated, such as incremented, upon a write to data object 201, to track a current version of data object 201. As another example, a timestamp of the writing transaction is utilized as version value 251 upon commitment to track the most current transaction to updated data object 201. Note that the previous discussion of transaction records as metadata is purely illustrative. In fact, in one embodiment, metadata includes any information describing data objects or properties thereof.

As an example to illustrate operation of the embodiment shown in FIG. 2, in response to a first read operation in a transaction referencing an address associated with data object 201, the read is logged in read log/set 265. This logging is often referred to as a read barrier operation within a read barrier, since the logging is a barrier for the read to be performed. In one embodiment, read log 265 is included in transaction descriptor 260. Transaction descriptor may also include write space 270, as well as other information associated with a transaction. However, write space 270 and read log 265 are not required to be included in transaction descriptor 260. For example, write space 270 may be separately included in a different memory space from read log 265 and/or transaction descriptor 260.

In one embodiment, logging a read includes storing version number 251 and an address associated with data object 201 in read log 265. Here, assume version number 251 is one to simplify the example. Upon encountering a transactional write referencing an address associated with data object 201, the write is potentially logged or tracked as a tentative update. In addition, metadata location 250 is updated to a lock value, such as two or a pointer to transaction descriptor 260, to represent data object 201 is locked by the transaction. In one embodiment, the lock value is updated utilizing an atomic operation, such as a read, modify, and write (RMW) instruction. Examples of RMW instructions include Bit-test and Set, Compare and Swap, and Add.

In one embodiment, the write updates cache line 215 with a new value, and an old value 272 is stored in write space 270. Here, upon committing the transaction, the old values in the write space are discarded. And conversely, upon aborting the transaction, the old values are restored, i.e. the locations are "rolled-back" to their original values before the transaction. Examples of write space 270 include a write log, a group of check pointing registers, and a storage space to log/checkpoint values to be updated during a transaction.

In another embodiment, write space 270 is a buffer that buffers/stores the new value to be written to data object 201. Here, in response to a commit, the new values are written to their corresponding locations, while in response to an abort the new values in write space 270 are discarded. Continuing the example from above, whether write space 270 is utilized as a write-buffer, a write-log, or not at all, the write, when committed, releases lock 250. In one embodiment, releasing lock 250 includes incrementing the value from the unlocked value of two to an unlocked, version value 251 of three. Alternatively, a timestamp for the transaction is written to metadata location 250 to indicate the most recent transaction to update data object 201. This versioning allows for other transactions to validate their reads that loaded data object 201 by comparing the other transactions logged version values in their read sets to current version value 251.

In one embodiment, computer system 200 is capable of performing barrier filtering to accelerate transactional execution. For example, some barrier operations for redundant accesses—a subsequent access within a transaction to the same data item, address, metadata, and/or transaction record—may be filtered out or elided, such that the transactional access is performed quicker and more efficiently. For example, in an STM, when a transactional read to data object 201 is performed, version number 251, and/or other information, is logged in read set 265. Upon a subsequent read to data object 201, the version is already logged. But previously the same read logging operation is performed in a read barrier before the transactional read is performed. Yet, in the embodiment with read filtering, upon the subsequent, transactional access to data object 201, the read set logging operation is filtered—not performed—to allow the subsequent read to be performed quicker and with less extraneous execution.

Any known apparatus' and methods may be utilized to indicate subsequent accesses include a redundant, extraneous access—an access in which barrier operations may be omitted due to previous transactional bookkeeping. Exemplary embodiments of maintaining a filtering indication, which are discussed in more detail below, include: (1) maintaining filter field 202 associated with data object 201 in cache 205 as buffered/ephemeral data to indicate redundant accesses to data object 201; (2) maintaining filter field 254 associated with metadata 250 in cache 205 as buffered/ephemeral data to indicate redundant accesses to metadata 250; (3) utilizing read/write monitors 271a, 272a associated with data object 201 to indicate redundant accesses to data object 201; and (4) utilizing read/write monitors 271b, 272b associated with metadata 250 to indicate redundant accesses to metadata 250.

The first embodiment—maintaining filter field 202 associated with data 201 as buffered/ephemeral data—is initially described. In one embodiment, hardware of processor 200 is capable of holding updates in a buffered manner. As stated above, transactional writes are not made globally visible until commit of a transaction. However, a local software thread associated with the buffered writes is capable of accessing the ephemeral data for subsequent transactional accesses. As a first example, a separate buffer structure is provided in processor 200 to hold the buffered updates, which is capable of providing the updates to the local thread and not to other external threads. Yet, the inclusion of a separate buffer structure is potentially expensive and complex.

In contrast, as another example, a cache memory, such as data cache 205, is utilized to buffer the updates, while providing the same transactional functionality. Here, cache 205 is capable of holding data items in a buffered coherency state. In one case, a new buffered coherency state is added to a cache coherency protocol, such as a Modified Exclusive Shared Invalid (MESI) protocol to form a MESIB protocol. In response to local requests for a buffered data—ephemeral information being held in a buffered coherency state—cache 205 provides the private data to the local processing element to ensure internal, transactional, sequential ordering. However, in response to external access requests, a miss response is provided to ensure any privately data is not made globally visible until commit. Furthermore, when a line of cache 205 is held in a buffered coherency state and selected for eviction, the buffered update is not written back to higher level cache memories—the buffered update is not to be proliferated through the memory system, i.e. not made globally visible—until after commit. Moreover, a cache fill due to a demand miss initializes an ephemeral cache line to a default zero value without incurring the traffic or wait time for a fill incurred by a fill from outer levels of the memory hierarchy. Upon commit, the buffered lines are transitioned to a modified state to make the data item globally visible.

Note that the terms internal and external are often relative to a perspective of a software thread associated with execution of a transaction. For example, a first processing element for executing a software thread associated with execution of a transaction is referred to a local thread. Therefore, in the discussion above, if a store to or load from an address previously written by the first thread, which results in a cache line for the address being held in a buffered coherency state, is received, then the buffered version of the cache line is provided to the first thread since it's the local thread. In contrast, a second thread may be executing on another processing element within the same processor, but it's not associated with execution of the transaction responsible for the cache line being held in the buffered state—an external thread; therefore, a load or store from the second thread to the address misses the buffered version of the cache line and normal cache replacement is utilized to retrieve the unbuffered version of the cache line from higher level memory.

Here, the internal/local and external/remote threads are being executed on the same processor. In fact, in some embodiments, they may be executed on separate hardware thread slots within the same core of a processor sharing access to the cache. However, the use of these terms is not so limited. As stated above, local may refer to multiple threads sharing access to a cache, instead of being specific to a single thread associated with execution of the transaction, while external or remote may refer to threads not sharing access to the cache.

Filter field 202 may be any size of element or object to store information associated with data object 201. In one embodiment, filter field 202 is the size of a word; however, filter field/field 202 may be a field smaller than a word, such as a single bit, as well as any other size object. As stated above, filter field 202 may be associated with data object 201 in any manner, such as being included as a field in data object 201, appended to data object 201, pointed to by a pointer in data object 201, referenced in association with data object 201, or maintained only locally as ephemeral data within cache 205. In the last example, field 202 may be provided in data object 201 as a construct of software. Here, a buffered write may store to field 202, which results in a private store to field 202 in cache 205. However, the private data is not proliferated through the memory hierarchy, such that field 202 in system memory 290 doesn't hold the buffered value. In contrast, filter field 202 may be mapped to data object 201 in software; as a result, buffered instructions operate directly on field 202 in cache 205 utilizing the software mapping. Mapping of ephemeral filtering metadata to data objects is discussed in more detail with reference to FIG. 5.

Filter field 202, in one embodiment, is to filter access barrier operations on a data granularity level. In response to a first access operation in a first transaction, which references an address for data object 201, access barrier code is executed. If filter field 202 includes a default value, such as a logical zero, to represent that data object 201 has not been previously access during a pendancy of the transaction, then barrier operations, such as logging of a read, logging a previous value for a write, or acquiring a lock for a write, are performed. In addition, a buffered store or ephemeral store is executed to set filter field 202 to a second value, such as a one. A buffered store, which is also referred to as an ephemeral or private store, includes a store operation to privately update filter field 202. In one embodiment, in response to a buffered store operation, cache line 215 is transitioned to a private or buffered cache coherency state.

Next, in response to a subsequent access operation in the first transaction, which references the address for data object 201, filter field 202 is checked. Here, filter field 202 includes the second value, i.e. a one, to represent a previous access to data object 201 has occurred during a pendancy of the first transaction. Therefore, access barrier operations, such as setting filter field 202, logging a read, logging a write, and acquiring a write-lock, are elided based on filter field 202 being set. As used herein, eliding operations refers to not executing operations; however, eliding operations may also include any method for not performing access barrier operations.

As a specific illustrated example, a compiler inserts a function call to an access barrier in response to detecting an access operation in a transaction. The access barrier function includes an operation to check the state of filter field 202. If filter field 202 is in a first state, a plurality of barrier operations are performed. However, if filter field 202 is in a second state, then the plurality of barrier operations are elided. As a result, when servicing subsequent accesses to data object 201 within the first transaction, the subsequent accesses are potentially accelerated, as access barrier operations associated with the subsequent accesses are elided. The ability to reduce redundant access barrier operations accelerates an STM, i.e. saves execution cycles by not re-executing barrier operations that would be redundant and extraneous.

An access, or access operation, refers to any access to data object 201 or cache line 215, such as a read, a write, a load, a store, as well as any other known access. In one embodiment, an access includes a read instruction. Here, when a compiler detects a read instruction in a transaction, read barrier code is called to perform read barrier tasks, such as logging version 251 in read log 265. Pseudo Code A below illustrates an embodiment of pseudo code for a read barrier.

---

Pseudo Code A: An embodiment of pseudo code for a read barrier

Read Barrier {
    If (data_object.filterword == 0) {
        Log a version of data_object in read log;
        Data_object.filterword = ephemeralstore(1);
    }
    Return;}

---

When executing the read barrier illustrated in Pseudo Code A, the filter field associated with data_object—data_object.filterword—is checked to determine if it holds a first value of zero to represent no previous access to the data_object has occurred during execution of the transaction. If data_object.filterword holds a 0, then a version of data_object is logged and data_object.filterword is updated to a value of 1 with an ephemeral/private store. Note that Pseudo Code A includes an extremely, oversimplified example, as a read barrier often include other operations, which may also be elided. For example, the read barrier may check to see if a data object is write-locked. And, the read barrier may also perform validation, such as validating the read set based on mismatching timestamp values or another indicator.

As a result, when a second read operation, which references the data_object, is encountered during execution of the transaction, the operation in the read barrier of Pseudo Code A to check data_object.filterword is executed again. However, as data_object.filterword is now set to 1, the version logging and the ephemeral store, which have already been performed, are elided and execution returns to perform the second read.

Note that an operation to determine if filter field 202 represents a previous read to data object 201 occurred during a transaction, may be inserted in a read barrier, as illustrated in Pseudo Code A, or outside the read barrier before a read operation. In the second instance, filter field 202 is checked before performing a read operation, and if filter field 202 represents that data object 201 has been previously read during execution of the transaction, then a read barrier is not executed/called. As an illustrative example a pseudo code statement of the following may be inserted:

---

Pseudo Code B: An embodiment of a filter operation before a read barrier

If(data_object_201.filter_word_202 == 0)
    {execute read barrier}
    else (perform the read of data_object_201).

---

In another embodiment, an access operation includes a write operation/instruction. Similar to operation of the read barrier disclosed above, a write barrier may be associated with a write operation. The write barrier, or a portion thereof, may be performed upon a first write to data object 202, and the barrier, or the portion thereof, may be elided up on a subsequent write to data object 202.

As an example of a write barrier, a write-lock may be acquired for data object 201 upon encountering a write operation. Alternatively, writes may be buffered in write space 270 for the duration of the transaction and write locks acquired upon commitment of the transaction for data to be copied from write space 270 to a program stack. Here, a write barrier potentially includes operations associated with buffering the data in write space 270. In another implementation, tentative writes may modify their corresponding locations and write space 270 logs original values in case of transaction roll-back. Analogous to read logging, in this example, a write barrier includes write logging. In addition, updating filter field 202 may also be considered a write barrier or a portion of a write barrier.

Therefore, by default, filter field 202 is set to a first value, such as a zero, to represent no previous modifications of data object 201 have occurred during execution of the current transaction. Here, an ephemeral line including filter filed metadata 202 may be initialized to a zero and a buffered coherency state. In response to encountering a write operation, it is determined that filter field 202 includes the first value. As a result, write barrier code/operations, such as acquiring a write-lock or logging/checkpointing original values, are executed. In addition, the write barrier sets filter field 202 to a second value, such as a one. Later, if a subsequent write to data object 201 is encountered, the original value is already logged and/or a write lock is already acquired, i.e. the write barrier has already been performed, as represented by filter field 202 being set to the second value. Therefore, the write barrier is elided based on filter field 202.

Consequently, a STM is accelerated through use of filter field 202 by allowing redundant, extraneous accesses in a transaction to avoid performing the same access barriers. However, use of filter field 202 is not so limited, as it may store any information related to data object 201. In one embodiment, both reads and writes to data object 201 are tracked utilizing filter field 202. In addition, a resource ID field, to track the resource, such as a core or thread, which accessed data object 201 may be included in filter field 202.

Furthermore, filter field 202 may be used to accelerate a write-buffering STM by providing information/hints about the locality of the most recent elements to be provided in response to accesses. Filter field 202 may be utilized to store annotation information on a per data object granularity.

An embodiment of using filter field 202 to track resource ID's, reads, and writes is illustrated below the Figure B.

TABLE A

An embodiment of filter field values

| Resource ID | State | Value | Represents |
|---|---|---|---|
| X | 1st state | One | Default: No Read and No Write |
| T0 | 2nd state | Two | Read and No Write |
| T0 | 3rd state | Three | No Read and Write |
| T0 | 4th state | Four | Read and Write |

Here, filter field includes two portions, a first portion to store a resource ID and a second portion to store a state/value to track accesses and detect conflicts. Filter field 202 is initialized or reset to the first state with value of one to represent no read and no write has occurred to data object 201 during execution of the transaction. Upon a read, filter field 202 is set to the second state to represent a read occurred during execution of the transaction. Furthermore, a resource ID, such as T0 may be stored in the first portion to represent, thread 0 performed the write. Note that a transaction ID may be utilized here as well in place of a resource ID. Similarly, to represent a write and no previous read, the second portion is set to the third state, and the fourth state is to represent a read and a write has occurred.

As stated above, in one embodiment, in response to setting filter field 202, cache line 215 is transitioned into a private cache coherency state. Common cache coherency states include Modified, Exclusive, Invalid, and Shared (MESI) states. Commonly, when a store or write to a cache line occurs, the cache line is placed in a modified state to indicate the cache line has been updated. Yet, in one embodiment, filter field 202 is updated with a private, or ephemeral, store operation. Essentially, filter field 202 is locally updated to perform tracking and conflict detection; however, the update to filter field 202 is not made globally visible.

Therefore, in response to a private store to modify filter field 202, cache line 215 is placed in/transitioned to a private cache coherency state. In one embodiment, when cache line 215 is in a private state and is evicted, filter field 202 information is discarded and not written back to data object 201. In another embodiment, in response to a write operation, cache line 215 is requested to be transitioned to a modified state from a private state. Here, cache line 215 is first invalidated, i.e. put in an invalid state, data object 201 is read back into cache line 215, and then the write is performed.

As a result of utilizing private/ephemeral stores, multiple processing elements may simultaneously make ephemeral stores into the same location. In other words, each processing element that makes an ephemeral store to filter field 202, holds a private copy of filter field 202. This allows the same object to be accessed concurrently by multiple transactions, while still providing for acceleration of transactions.

Similar to the first scenario, in one embodiment, filter field 254 associated with metadata 250 in cache 205 is maintained as buffered/ephemeral data to indicate redundant accesses to metadata 250. As an illustrative example, filter field 254 is part of metadata 250, mapped to data object 201 through a hash, or mapped by some other reference from data object 201 to filter field 254, as discussed in more detail in reference to FIG. 5. Note the difference between scenario one and scenario two is that the filter field is to filter accesses to metadata 250, instead of accesses to data object 201.

As an example, metadata 250 may include a transaction record—a transactional lock as described above—to provide tracking of accesses to data object 201. Often, in STMs, data object 201 is associated with transaction record 250 through a hash function or some other manipulation of an address for data object 201. Consequently, more than one datum may map to the same transaction record. With the use of the embodiment described in reference to scenario one, a value—version value—of transaction record 250 is logged into read set 265 upon a read to data object 201. However, previously upon a subsequent read to a different data object, which also maps through the hash function to transaction record 250, the version value is once again logged. Therefore, in some cases, filtering on data addresses—in scenario 1—incurs multiple, redundant operations, such as logging transaction record 250 more than once within read set 265.

As a result, in one embodiment, filtering is performed on metadata, such as transaction record 250. Here, multiple accesses to data object 201 are filtered, as the address for data object 201 hashes to transaction record 250. Furthermore, redundant accesses to multiple data objects, each of which map to transaction record 250, are also filtered because of their common hash to transaction record 250. As a consequence, in the example above, a redundant logging operation of transaction record 250 is filtered upon reads to different data objects in response to a previous read to data object 201, which already resulted in transaction record 250 being logged in read set 265.

An embodiment of an oversimplified, modified logRead function that filters redundant logging operations using buffered stores to mark transaction records that have already been logged is illustrated in Pseudo Code C below. Note that pseudo code illustrated herein is often oversimplified to further the discussion. And, the pseudo code may be implemented utilizing any code and compiled into program code recognizable by decoders in a processors as part of an ISA. For example, the movxb instruction below in Pseudo Code C may represent a buffered store instruction to update a filter field of a transaction record to an ephemerally held logical value of one to indicate a previous read or that the transaction record has already been logged in a read set.

Pseudo Code C: Embodiment of a Read Barrier function for filtering metadata

```
void logReadUtm(TxnDesc* txnDesc,TxnRec* txnRecPtr) {
    /* skip read set logging if filter is set on txnRec */
    if (txnRecPtr->filter == 0) {
        logAppend(txnDesc->readSet,txnRecPtr);
        movxb<char>(&txnRecPtr->filter,1);
    }
}
```

As illustrated, the logRead function logs a transaction record pointer into the read set held in the transaction descriptor. Note that this function may be used for both optimistic and pessimistic read STMs. Here, logRead filters on the transaction record to eliminate redundant software logging operations using a filter field privately stored in the cache line holding the transaction record to indicate whether the current thread has already logged the transaction record in its read set; a non-zero value in the filter field indicates that this transaction has already inserted the transaction record into its read set. Note, as an optional optimization for optimistic read STMs, the logReadUtm function may abort if the filtering hits—the filter value is non-zero or checkFilter returns true—and the transaction record version number is greater than the current timestamp—txnRec>txnDesc→timestamp—as this implies that another transaction has updated a previously logged transaction record. This detects an abort condition without validation, but potentially adds an extra compare operation in the common case that the transaction does not abort. Additionally, the transaction may abort if (*txnRecPtr)>txnDesc→localTimeStamp and the transaction record is in the filter set. As a side note, the logRead function, in this example, references filter as a field within the transaction record.

However, since the operation to store to the filter field is a buffered store, the filter data is not persistent—is not proliferated to higher levels of the memory hierarchy—but rather only maintained locally, privately in the cache line holding the transaction record. Furthermore, a filter field may be associated in any manner with metadata or a data object, such as through a hash of an address referencing metadata that indexes into a table of filter fields. Having described the potential efficiency of filtering metadata and a specific, illustrative example of filtering based on transaction records; it's important to note that filtering of metadata and data is not mutually exclusive. Instead, in some implementations, designers may wish to filter certain operations based on data, metadata, or both.

Next, in scenarios three and four, different embodiments of tracking accesses for filtering are discussed. Specifically, instead of buffered filtering—utilizing ephemeral filter information—hardware monitors are utilized to track accesses to data and/or metadata. Yet, the tracking information, which previously was utilized for conflict detection, in one embodiment, is to filter redundant access barrier operations, as discussed above. To describe the embodiments utilizing read and write monitors, monitors 270 are briefly described to provide the context for filtering utilizing monitors 270. However, the operation of monitors 270 is not described in specific detail to avoid unnecessarily obscuring the discussion. Monitors 270 are typically to detect, monitor or track accesses, and potential subsequent conflicts, associated with data items, such as data object 201. As one example, hardware of processor 100 includes read monitors and write monitors to track loads and stores, which are determined to be monitored, accordingly.

As an example, hardware read monitors and write monitors are to monitor data items at a granularity of the data items despite the granularity of underlying storage structures. In one embodiment, a data item is bounded by tracking mechanisms associated at the granularity of the storage structures to ensure the at least the entire data item is monitored appropriately. As a specific illustrative example, read and write monitors include attributes 271a, 271b and 272a, 272b associated with cache locations 215, 216 to monitor loads from and stores to addresses associated with those locations, respectively. Here, a read attribute 271a is set upon a transactional read event to an address associated with cache line 215. Essentially, read attribute 271a, in a default state, indicates no previous, transactional access to cache line 215, while the read attribute 271a in a second, accessed state is to indicate cache line 215 has been accessed during a pendency of a transaction. In this case, write attributes 272a, 272b operate in a similar manner for write events to monitor for potential conflicting reads and writes. Setting and resetting monitors 270 may be performed by hardware automatically in response to transactional accesses. Or, program code may include specific test, set, reset, and other instructions recognizable by decoders of processor 200 that are to read and modify monitors 270.

In a transactional memory system, such as an HTM, hardware is capable of detecting conflicts. As an example, hardware detects conflicts based on snoops for reads and writes to cache locations with read and/or write attributes set to indicate the cache locations are monitored, accordingly. Inversely, setting read and write monitors, or updating a cache location to a buffered state, in one embodiment, results in snoops, such as read requests or read for ownership requests, which allow for conflicts with addresses monitored in other caches to be detected. Therefore, based on the design, different combinations of cache coherency requests and monitored coherency states of cache lines result in potential conflicts, such as a cache line holding a data item in a shared read monitored state and a snoop indicating a write request to the data item. Inversely, a cache line holding a data item being in a buffered write state and an external snoop indicating a read request to the data item may be considered potentially conflicting. In one embodiment, to detect such combinations of access requests and attribute states snoop logic is coupled to conflict detection/reporting logic, such as monitors and/or logic for conflict detection/reporting, as well as status registers to report the conflicts. However, in other implementations, such as during software transactional execution, software is able to perform the conflict detection. Or, software may be able to leverage the aforementioned hardware features to detect conflicts.

Having briefly discussed the operation of monitors above, the discussion now turns to scenarios three and four: (3) utilizing read/write monitors 271a, 272a associated with data object 201 to indicate redundant accesses to data object 201; and (4) utilizing read/write monitors 271b, 272b associated with metadata 250 to indicate redundant accesses to metadata 250. Whether applied to data or metadata, monitoring, in one embodiment, operates like buffered, filter fields, as described above. However, instead of setting a filter field upon an access utilizing a buffered store, monitors 270 are set in response to designated memory accesses. As above with a filter field held ephemerally, hardware may manage/maintain monitors 270, such that the hardware automatically updates monitors 270 upon transactional accesses. Additionally, or alternatively, specific instructions are provided in the ISA for access to monitors, such as set, reset, read, test, etc.

To provide an example, assume a transactional read barrier is called before an access to a data address for data object 201, which is held in cache line 215. An instruction, when executed, is to check read monitor 271a for metadata associated with the data address for data object 201. If read monitor 271a is not set—in a default state—then a version value held in metadata 250 is logged in read set 265. Furthermore, a read monitor instruction/operation, when executed, is to set read monitors 271a to a previously read value—a logical one in this example—and other read operations, such as on demand, timestamp validation or slowpath operations, may also be performed. Upon a subsequent read, either to a data address for data object 201 or another data address that hashes to metadata location 250, the read barrier is similarly called. Here, when the test read monitor operation is executed to test read monitor 271a, the value—a logical one—indicates that metadata 250 has been previously logged. As a result, some of the read barrier operations, such as the read set logging, may be elided/omitted. Therefore, upon a subsequent transactional access to any data address associated with metadata 250, certain read barrier operations may be filtered.

Pseudo code D below illustrates an embodiment of read barrier code for filtering read barrier operations utilizing monitoring of transaction record metadata.

---

Pseudo Code D: Embodiment of RB function for filtering metadata utilizing monitors

```
Type tmRd<Type>(TxnDesc* txnDesc,Type* addr) {
    Type val = *addr;
    TxnRec* txnRecPtr = getTxnRecPtr(addr);
    if (testrm(txnRecPtr) == false) {
        Setrm(txnRecPtr);
        TxnRec txnRec = *txnRecPtr;
        val = *addr;
        if (txnRec != txnDesc) {
            while (isWriteLocked(txnRec) || txnRec != *txnRecPtr) {
                /* contention slow path */
                handleContention(...);
                txnRec = *txnRecPtr;
                val = *addr;
            }
        }
    }
    return val;
}
```

---

Here, monitoring transactions records without monitoring the data potentially avoids increasing the size of the read monitored MBLKs. Here, MBLK refers to a unit or granularity of memory that the hardware monitors, such as a cache line, page, a data object, or another block of memory. Additionally, in comparison to monitoring data, it may also reduce and bound the number of read-monitored MBLKs, since multiple addresses may hash to the same transaction record. Furthermore, it may also allow more transactions to run in a cache-resident mode, since losing a MBLK containing a datum should not cause a loss of read monitoring. However, monitoring may have a slightly longer fast path sequence for inline implementation.

Yet, filtering, either based on monitoring or buffering, is not limited to transactions records, as filtering may be applied to any metadata—any transactional information. Additionally, monitoring/buffering may also be applied to data, either singularly or in conjunction with filtering of metadata. In fact, Pseudo Code E below depicts an embodiment of a read barrier function including filtering based on monitoring of data and metadata.

---

Pseudo Code E: Embodiment of RB function for filtering metadata utilizing monitors

```
Type tmRd<Type>(TxnDesc* txnDesc,Type* addr) {
    Type val = *addr;
    if (testrm(addr) == false) {
        setrm(addr);
        val = *addr;
        TxnRec* txnRecPtr = getTxnRecPtr(addr);
        if (testrm(txnRecPtr) == false) {
            setrm(txnRecPtr);
            TxnRec txnRec = *txnRecPtr;
            val = *addr;
            if (txnRec != txnDesc) {
                while (isWriteLocked(txnRec) || txnRec != *txnRecPtr) {
                    /* contention slow path */
                    handleContention(...);
                    txnRec = *txnRecPtr;
                    val = *addr;
                }
            }
        }
    }
    return val;
}
```

---

Here, monitoring both the accessed data and the transaction records potentially increases the number of read-monitored MBLKs, which also potentially increases the chances that the hardware will lose a monitored cache line. And thus, the chance that a transaction will be able to skip read set validation—in an optimistic read TM system—is also potentially reduced. However, the fastpath is potentially accelerated due to the initial check of the read monitor for the data—testrm(addr)—in that the transaction record does not have to be located if the data has already been accessed.

Just as filtering data and metadata at the same time is possible, it's important to note that buffering and monitoring is not mutually exclusive. Therefore, as described above, filtering utilizing buffering or monitoring of data or metadata results in 16 potentially design implementations, where any combination of the four may be utilized. As a consequence, a scenario where data and metadata are both monitored and buffered may exist, as well as any other scenario in between.

Figure 3:
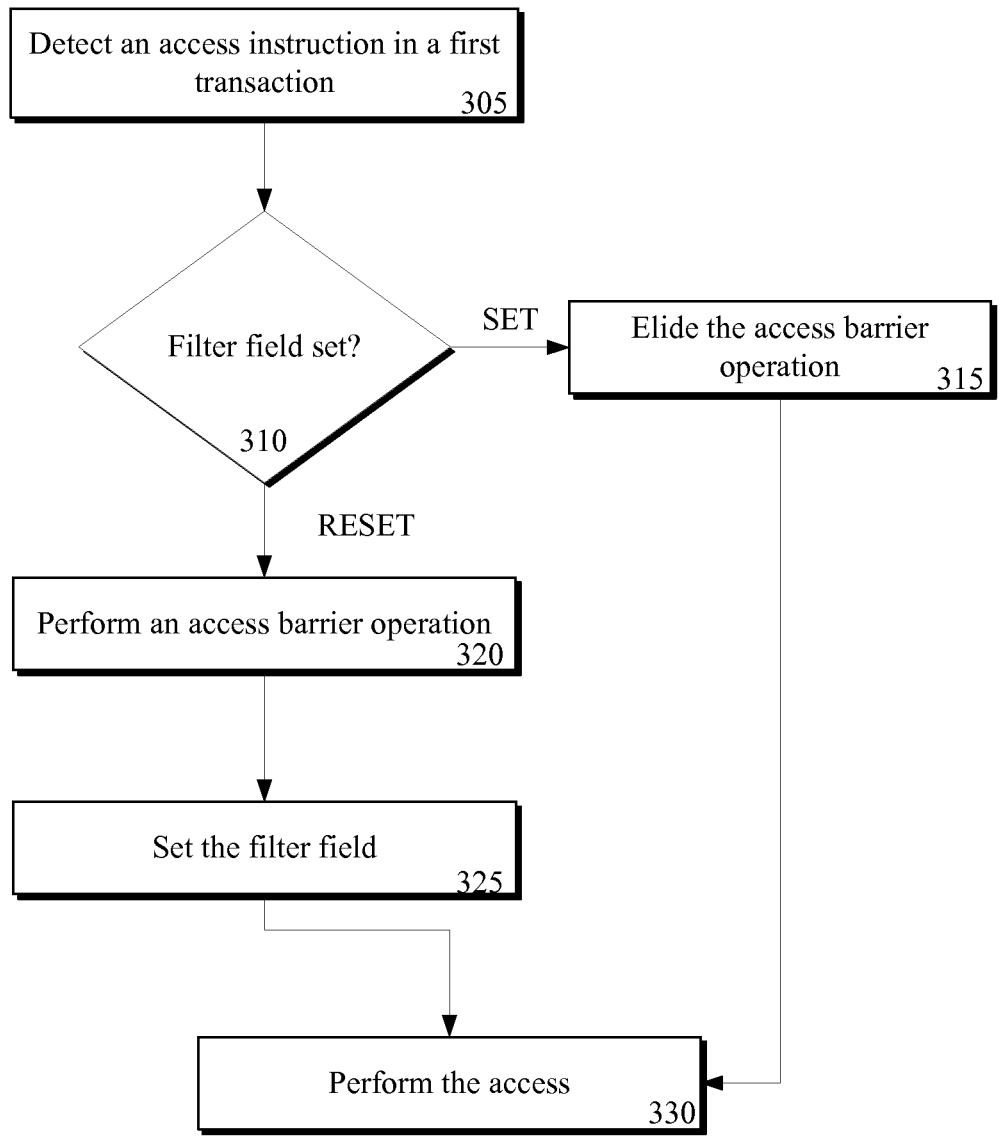
FIG. 3 illustrates an embodiment of a flow diagram for a method of accelerating a Software Transactional Memory (STM) system.

Turning to FIG. 3, an embodiment of a flow diagram for a method of accelerating an STM system is illustrated. In flow 305, an access instruction referencing a first data object is detected. As an example, an instruction may be decoded by decoders in a processor into a plurality of micro-operations; one of which is a transactional memory access operation referencing an address for the data object. Next, in flow 310, a filter field associated with the data object is checked. In one embodiment, the filter field associated with the data object includes a filter field directly associated with the data object. In another embodiment, the filter field is indirectly associated with the data object, such as the filter field being directly associated with metadata that is directly associated with the data object. Whether the filter field is directly associated with the data object or indirectly through metadata for the data object; as described above, the filter field may include a field ephemerally held in a cache line or a filter field, such as an access monitor, associated with a cache line.

If the filter field is reset, i.e. it holds a default value, then the filter field indicates no previous access to the data object—or metadata depending on the implementation—during a pendancy of the transaction. Here, in flow 320, an access barrier operation is performed. For example, a logging operation or set of operations associated with the access is performed. Other examples of common barrier operations include: testing a transactional lock/transaction record; acquiring a transactional lock/transaction record; logging of a version value or transaction record value; checkpointing a previous value before a write; setting a read monitor, buffered field, or other filter field; checking a timestamp; validating timestamps; validation of a read set; handling contention; on-demand validation of a read; and setting/resetting monitors. Note that the aforementioned list of barrier operations is purely illustrative for read and write barriers; as a result, any of them may be omitted, while other known operations associated with a transactional a read or write may be included. Specifically, in this embodiment, the filter field is set to indicate an access has occurred during execution of the transaction in flow 325.

Alternatively, returning to flow 310, if the filter field associated with the data object is set to indicate a previous access, then the access barrier operation, or a group of access barrier operations, is/are elided in flow 315. Whether after the elision in flow 315 or after performing access barrier operations in flows 320 and 325, the access is then performed in flow 330. As a result, when first accesses either to data or to metadata in a transaction are encountered, associated barrier operations are performed. However, subsequent access barrier operations within a transaction are accelerated—redundant, extraneous operations are elided. In addition, if metadata is utilized to filter these redundant, extraneous operations, then subsequent access to other data that is associated with the same metadata may also be elided to provide additional acceleration.

Figure 4A:
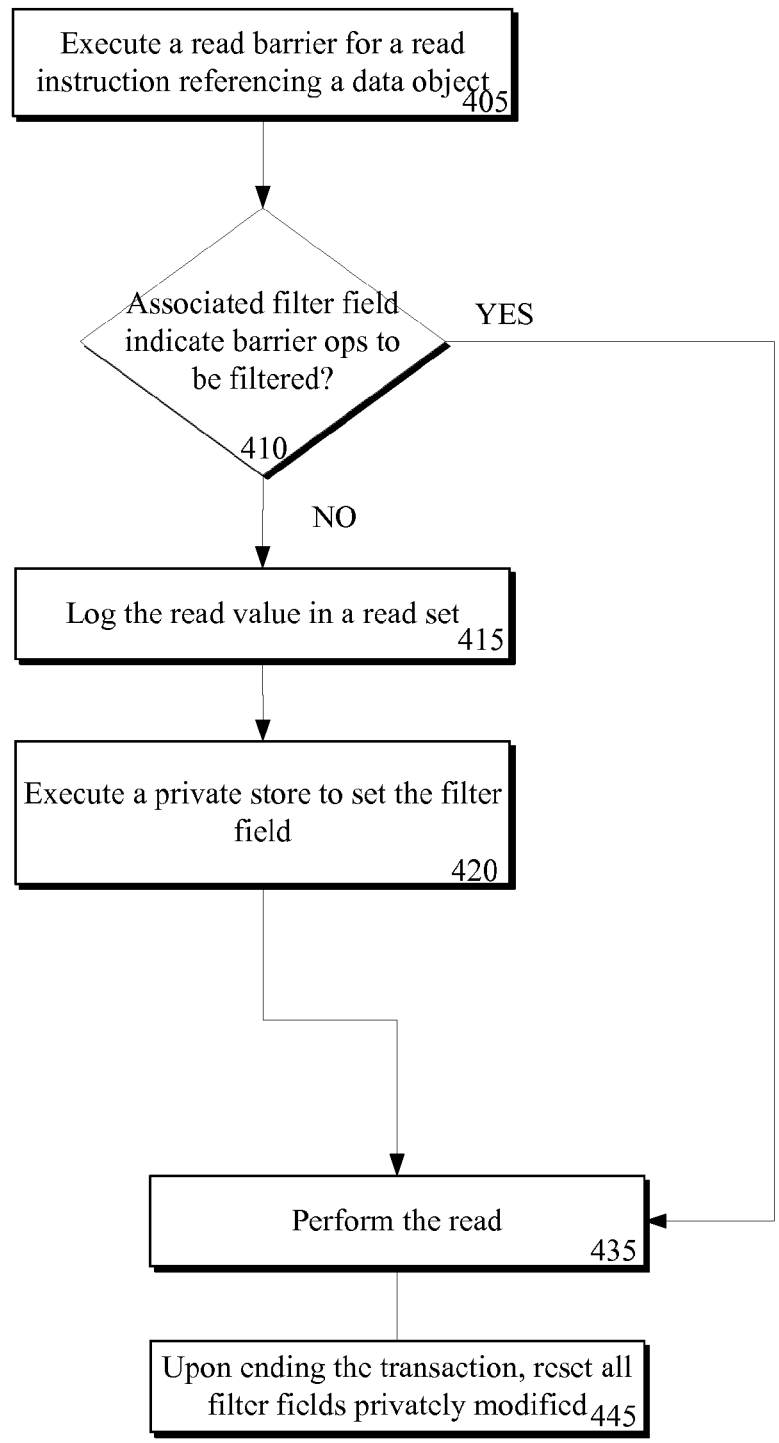
FIG. 4a illustrates an embodiment of a flow diagram for a method of accelerating reads in a Software Transactional Memory (STM) system.

Turning to FIG. 4a, an embodiment of flow diagram for a method of accelerating reads in a transaction is illustrated. In flow 405, a read barrier is encountered for a read instruction/operation. As an example, a call to a read barrier inserted inline with application code by a compiler is executed to call the read barrier, which is provided in a library accessible by the application code. Note that the flows discussed below are in reference to examples of read barrier operations. However, a full read barrier often includes more operations. Consequently, any known read and/or write barrier operations may be filtered, as filtering of operations is not limited to the embodiments described below. In flow 410, it's determined if a filter field associated with the data object indicates read barrier operations should be filtered. As an example, a test operation as part of a conditional, language statement is utilized to determine the value of the filter field. In one embodiment, the test operation includes a load operation to read an ephemerally held filter field in a cache line that is to hold the data object to be read and/or a cache line that is to hold a transaction record for the data object to be read.

If the filter field holds a first, default value indicating the data object was not previously read or that the transaction record in the metadata was not already logged, then in flow 425 a version value from the transaction record associated with the data object is logged. In one embodiment, logging a version value includes copying a version in a metadata location associated with the data object to a read log entry. Next, in flow 420, a store is executed to set the filter field to indicate that the data object was previously read or the metadata was previously logged. In one embodiment, the store includes a private or buffered store. Here, a cache line holding the filter field is transitioned to a private cache coherency state. As a result, in response to an eviction of the cache line, the contents of the filter field are not written back to memory. Moreover, when a request to transition the cache line from a private state to a modified state is detected, the cache line is invalidated, the new line is brought to the cache, and then the operation requesting the transition is performed. After performing the read barrier operations, the read of the data object is performed in flow 435.

In a return to flow 405, the read barrier is subsequently encountered. Again, it's determined if the filter field associated with the data object represents that the data object was previously read during execution of the first transaction or that the transaction record was previously logged. Here, the filter field was previously set in response to the first execution of the read. Therefore, the filter field now indicates a previous read to the data object has occurred or the transaction record has already been logged in the read set. As a result, the read of the data object is performed in flow 435 without logging the version in flow 415 and executing the store in flow 420, as those operations were performed in response to the first read operation. Note, performing the read directly without moving through flow 415 and 420 is often referred to as eliding those operations. Finally, when the transaction concludes, all the filter fields that were updated with the private stores are reset to the default state. In one embodiment, an instruction set, i.e. instructions recognized by decoders in a processor, includes a reset instruction to reset all the private store locations.

Figure 4B:
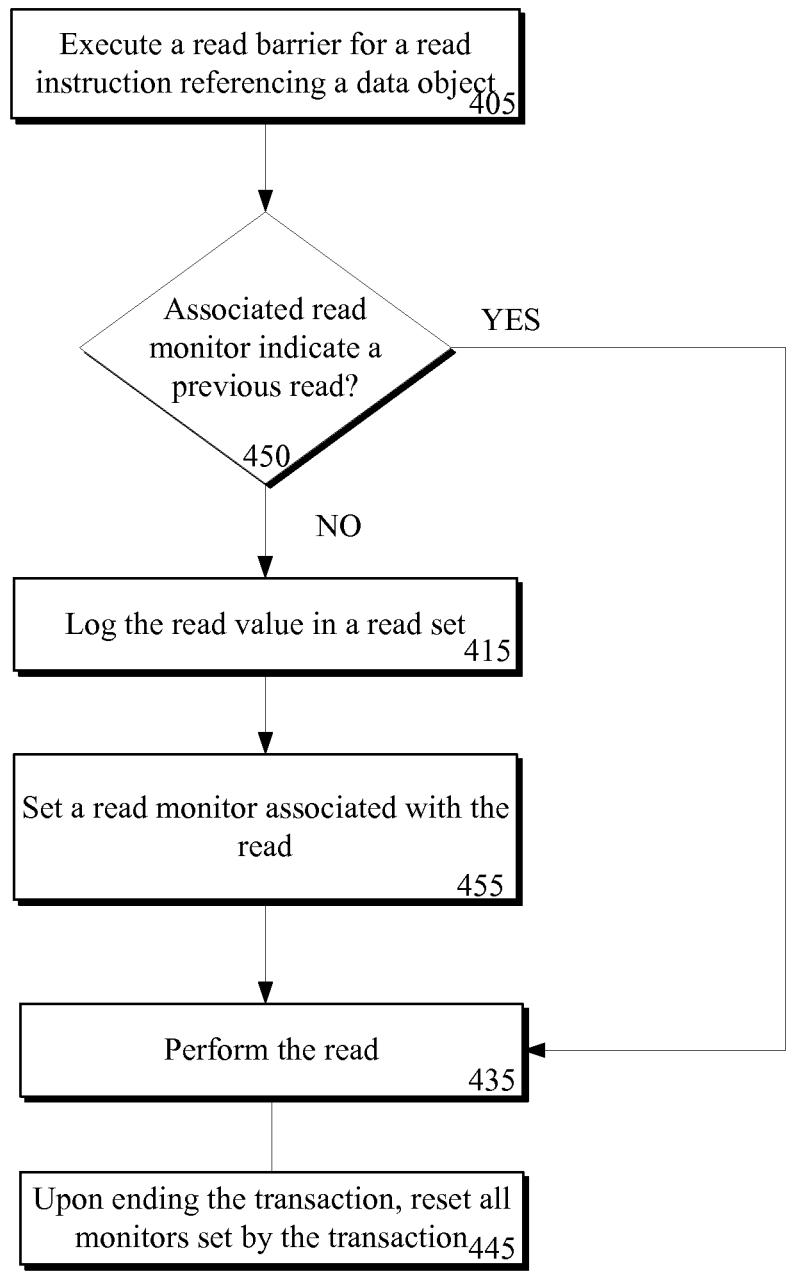
FIG. 4b illustrates another embodiment of a flow diagram for a method of accelerating reads in a Software Transactional Memory (STM) system.

Referring next to FIG. 4b, another embodiment of flow diagram for a method of accelerating reads in a transaction is illustrated. As above, a read barrier is encountered in flow 405. However, in decision flow 450, instead of executing a load/test operation to read an ephemerally held filter field, a read monitor for the data object and/or a read monitor for a transaction record associated with the data object is checked. If the read monitor indicates no previous access to the data object or the transaction record, depending on the implementation, then read barrier operations—logging the read in flow 415 and setting the appropriate read monitor in flow 455—are performed before completing the read.

In contrast, if the read monitor indicates a previous access, such as an access to a transaction record for the data object, then the read barrier operation in flow 415 and 455 are filtered, i.e. not performed. Again, upon ending the transaction, all the monitors set are reset. From these two figures—FIG. 4a, b—it can be seen that acceleration of transactional execution may be had through non-performance of extraneous barrier operations upon subsequent accesses to data, or metadata therefore.

Figure 5:
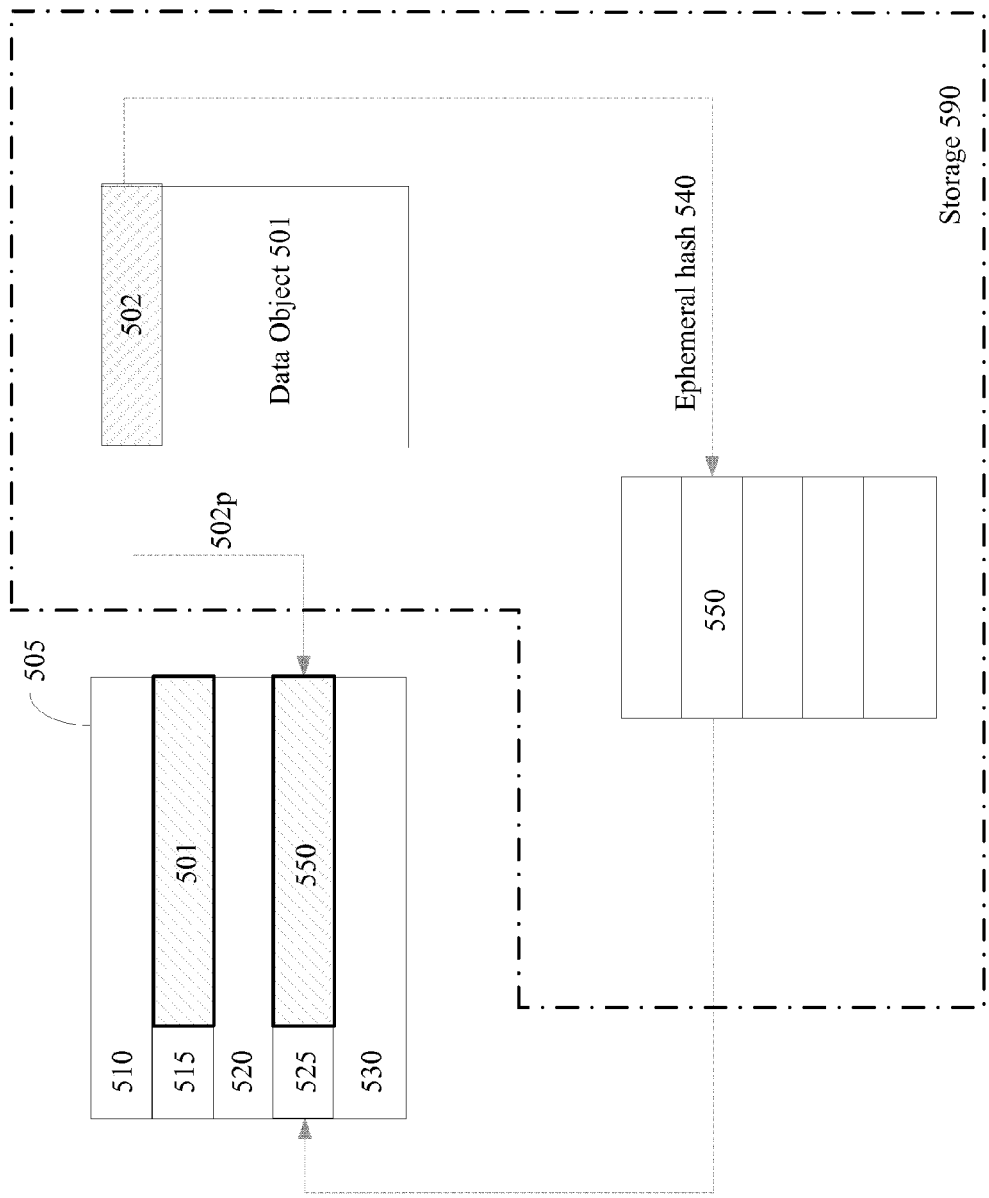
FIG. 5 illustrates embodiments of mapping data objects to ephemeral filtering information.

Referring next to FIG. 5, an embodiment of a mapping of data to an ephemeral cache line holding filtering metadata is illustrated. In some implementations, hardware may provide transparent mapping of metadata to data, through a hardware implemented metaphysical address space. However, either in conjunction with hardware, or separately for systems that don't include such hardware support; in some embodiments, software is capable of mapping/associating the location of ephemeral, filtering metadata to data objects. Therefore, in the embodiments described above including discussion of private, ephemeral, or buffered filtered fields, the mapping embodiments described below provide examples of software's ability to associate and reference this private filtering data.

In one embodiment, mapping includes a one-to-one mapping—associating each data object, such as data object 501, with a location, cache line, or set of bits, such as location 550 within cache line 525 of cache 505. Examples of one-to-one mapping schemes include: (a) a pointer 502p in each data object's header 502 that points to the object's ephemeral location 550; (b) an offset in each data object's header 502 that gives the offset of the ephemeral cache line 525 relative to the data object 501's base address; (c) an index in the data object 501's header 502 that offsets into a segment containing ephemeral cache lines, such as cache line 525 holding ephemeral metadata 550; and (d) a mapping using address arithmetic, such as using the heap manager's metadata. In another embodiment, a hashing scheme is utilized to map object 501 to an ephemeral hashtable 540 similar to the one used in software filtering schemes. Each of these examples and embodiments are discussed in more detail below—often with reference to pseudo code—to provide more in depth discussion of mapping ephemeral filtering data to data objects.

As a first example, the following exemplary sequence—Pseudo Code F—illustrates an embodiment of filtering using 1:1 fixed mapping, such that a fixed range of virtual memory is allocated for 1:1 mapping.

---
Pseudo Code F: Embodiment of pseudo code for 1:1 fixed mapping

```
mov eax, obj
shr eax, 4 /* 16-byte granularity */
bt [#tablebase], eax /* tests the ephemeral filter bit */ jeq done
/* slow path bit shifting ... */
ebs ... /* ephemeral store */
<normal barrier instruction sequence>
done:
bt [#tablebase+bitno], obj /* tests the ephemeral filter bit */ jeq
done
<normal barrier instruction sequence>
done:
```
---

As another example, the following code—Pseudo Code F—illustrates an embodiment of mapping using a pointer 502p to metadata 550 in the header 502 of data object 501. Here, the metadata may reside anywhere in the virtual address space. The EMD_ptr_offset constant includes the offset of the metadata pointer from the base of the object. And, an ephemeral store instruction may be utilized to set the ephemeral metadata value. Note that this pseudo code assumes a minimal metadata 'depth' includes an 8 bit byte.

---
Pseudo Code G: Embodiment of Pseudo code for mapping utilizing object header pointer

```
mov eax,&object
mov eax, dword ptr [eax +
EMD_ptr_offset]
test byte ptr [eax],#mask
jne skip_barrier
<ephemeral store to [eax] to set
filtering metadata>
```
---

Pseudo Code H, on the other hand, illustrates an embodiment that assumes a minimal metadata depth of 1 bit per filter, which potentially requires additional state and instructions to perform a bit extraction/test or insertion/set. The EMD_mask constant is a field offset in the object holding the object's bit mask for the ephemeral metadata byte:

---
Pseudo Code H: Embodiment of pseudo code for mapping assuming a 1-bit MD depth

```
mov eax,&object
mov eax, dword ptr [eax +
EMD_ptr_offset]
mov cl, byte ptr [eax + EMD_mask]
test byte ptr [eax],cl
jne skip_barrier
<ephemeral store to [eax] to set
filtering metadata>
```
---

Some of the aforementioned examples assume that an instruction was performed earlier to flash zero (invalidate) all ephemeral lines. However, in one embodiment, the number of times ephemeral lines are cleared may be reduced using a metadata id scheme implemented in software within the metadata itself. As a result, in this example ephemeral lines are flushed on MD_ID recycling. As a specific illustrative example, the memory manager reserves, and optionally initializes, metadata pointer fields in objects. And at one point allocates metadata fields from a metadata heap. Later, the memory manager is able to reclaim the metadata fields at garbage recycling time.

As yet another approach to ephemeral metadata storage management, ephemeral metadata lines are interspersed with object lines. Here, instead of holding pointers to the ephemeral filtering data in the objects, an (8- or) 16-bit displacement is stored into the object header; this displacement refers backwards to some metadata field, which is contained within a closely preceding ephemeral cache line. In some implementations, $2^8$ B displacements may not be "far" enough, so the following filter code—Pseudo Code I—includes an example utilizing 16-bit displacement.

---
Pseudo Code I: Embodiment of pseudo code for 16-bit displacement mapping

```
mov eax,&object
sub eax, word ptr [eax+EMD_offset]
test byte ptr [eax],#mask
jne skip_barrier
<ephemeral store to [eax] to set
filtering metadata>
```
---

Since objects may be larger than $2^8$ or $2^{16}$ B, in some embodiments a negative displacement to metadata in a preceding ephemeral line may be utilized. Here, the memory manager allocates metadata blocks from a metadata ephemeral cache line. And, as the manager relocates or allocates objects, it adds a displacement back to the metadata line to each object. The manager also potentially emits a new metadata line whenever the last one fills or when the displacement back to the old metadata line overflows the maximum displacement. Here, searching a free list at metadata allocate or free time may not be performed.

In another variation, the runtime implicitly associates a metadata bit/nybble/byte/etc. with each word/dword/qword, located by address arithmetic, as illustrated below in Pseudo Code J.

---
Pseudo Code J: Embodiment of pseudo code for mapping utilizing address arithmetic

```
byte* object = ...;
byte* heap_segment_base = ...;
byte* emb_base = ...;
byte* emb = emb_base + ((object – heap_segment_base)/
(sizeof subblock) *
bits_per_emb / 8); // then must extract or insert bits from/to *emb;
```
---

Compared to the previous approaches, this approach potentially doesn't incur per-object header overhead; however, it potentially incurs code bloat and a long path length, which is in contrast to one of the major goals for filtering. Also, certain data layouts may perform searches for which heap segment base applies for a given object. Careful heap segment, virtual address allocation and pointer arithmetic tricks may simplify the searches. As a result, the previous included approach may be refined by recovering the heap_segment_base from a data object address as follows in Pseudo Code K. In addition, a new instruction, or operation, may be utilized to run in parallel with the fetch of emb_base and the subsequent add to replace the limited repertoire of practice andmaks and shramt values in some implementations.

---

Pseudo Code K: Embodiment of refined for address arithmetic mapping

```
byte* object = ...;
byte* heap_segment_base  =  object & HSB_MASK; byte*
emb_base = ...;
byte* emb = emb_base + ((object − heap_segment_base)/(sizeof
subblock) * bits_per_emb / 8); // then must extract or insert bits
from/to *emb
Which simplifies to:
byte* object = ...;
byte* emb_base = ...;
byte* emb =    emb_base + ((object&~HSB_MASK) >>
(LG_BITSIZEOF_SUBBLOCKLG_BITSIZEOF_EMB));
// then must extract or insert bits from/to *emb
Which becomes:
mov eax,&object
and eax,~HSB_MASK
shr eax,#(LG_BITSIZEOF_SUBBLOCK-LG_BITSIZEOF_EMB)
add eax,emb_base
test byte/word/dword ptr [eax]
jne skip_barrier
At which point one can consider a macro-operation to keep the code
bloat down and enable other implementations:
mov eax,&object
and_shr_add   eax,((#andmask)|(#shramt)),emb_base   test
byte/word/dword ptr [eax]
jne skip_barrier
```

---

The above discussion has focused on the afore-listed examples of one-to-one mapping. Yet, in another embodiment, mapping of ephemeral filtering metadata to data is performed utilizing a hashing scheme. A sequence for filtering using hashing is illustrated below in Pseudo code L. Below, the symbolic register obj holds a pointer to the base of an object and the compile-time constant tablebase is the address of the filter table. On commit or abort, the transaction clears the ephemeral bits

---

Pseudo Code L: Embodiment of mapping utilizing a hashing scheme

```
        mov eax, obj
        and eax, #tableindexmask
        cmp obj, [#tablebase + eax]    /* reads ephemeral bits */
        jeq done
        ebs [#tablebase + eax], obj    /* writes ephemeral bits */
        <normal barrier instruction sequence>
        done:
```

---

The open for read template may be optimized by combining the barrier with the object null check. Often in managed languages, null pointer checks are always performed. As a result, the value for a null pointer is changed from zero to some other invalid pointer value, as follows in Pseudo Code M. Note that it's possible to combine the null pointer check with the filtering even when not using ephemeral stores, in which case, it may not be necessary to change the null pointer value from zero

---

Pseudo Code M: Embodiment of mapping utilizing a hashing scheme

```
        mov eax, obj
        and eax, #tableindexmask
        cmp obj, [#tablebase + eax]    /* reads ephemeral bits */
```

-continued

Pseudo Code M: Embodiment of mapping utilizing a hashing scheme

```
        jeq done
        cmp obj, 1
        jeq nullptrexception
        ebs [#tablebase + eax], obj    /* writes ephemeral bits */
        <normal barrier instruction sequence>
        done:
```

---

As a result, the use of ephemeral filtering information in cache lines allows the omission/removal of several instructions from pure software based filtering. For example, it potentially eliminates the load of the filter table base from thread-local storage (TLS). Here, logical processors may use the same virtual address rather than the address of a thread-local table loaded from TLS. Additionally, compiler optimizations may eliminate redundant loads of this filter table base, hoist such loads to the beginning of a method, or hoist the loads outside of loops. As another potential advantage, ephemeral filtering may also eliminate the load of the transaction identifier from TLS and the xor of this identifier into the hash index. Because a transaction may quickly bulk clear its ephemeral lines on commit or abort, the transaction no longer needs 'salting' to distinguish different transactions and to amortize the overhead of clearing the table. 'Salting' may still be useful for nested transactions, as described below. Moreover, this ephemeral filtering may also avoids memory traffic by not writing back dirty table entries and by initializing table entries to zero on a demand miss without going to outer levels of the memory hierarchy (unless the replacement policy evicts a dirty line to make room for an ephemeral line). Furthermore, ephemeral filtering, in some embodiments, utilize only a single scratch register.

In a transactional memory system that supports nested transaction execution, it's potentially advantageous to enable the nested transactions to filter their read and write sets. To allow a nested transaction to filter its undo log, or to allow a nested transaction to filter its reads and writes independently of its parent transaction, 'salting' into this code sequence as depicted in Pseudo Code N below.

---

Pseudo Code N: Embodiment of including 'salting' to allow nested transaction filtering

```
        mov ecx, obj
        and eax, #tableindexmask
        xor ecx, fs:[#txnsaltslot]
        cmp ecx, [#tablebase + eax]    /* reads ephemeral bits */
        jeq done
        mov [#tablebase + eax], ecx    /* writes ephemeral bits */
        <normal barrier instruction sequence>
        done:
```

---

Note, when the number of nested transactions is greater than the number of table entries, the ephemeral filter table may be cleared. An operating system Task Control Blok (TCB) may provide an extra slot—txnsaltslot—for the transaction salt to avoid extra levels of indirection. Reintroduction of salting potentially consumes two scratch registers as compared to the base instruction sequence, which typically only utilizes a single scratch register.

In a 32-bit (64-bit) CLR that aligns objects on 4-byte (8-byte) boundaries, the bottom 2 (3) bits of the hashtable entries to encode other information may be utilized, since these bits are always zero. For example, the least-significant bit of a hashtable entry is utilized as a write barrier filter.

Exemplary pseudo code of this example is illustrated below for both unmanaged and managed STMs in Pseudo Code O.

Pseudo Code O: Embodiment of utilizing a portion of a hashtable entry for filtering

```
mov eax, obj
mov ecx, obj
and eax, #tableindexmask
or ecx, 1              /* set the wr barrier bit (LSB) */
mov edx, ecx
xor ecx, [#tablebase + eax]   /* reads ephemeral bits */
test ecx, 0xFF...FD           /* were the bits we care about equal? */
jz done
mov [#tablebase + eax], edx   /* writes ephemeral bits */
<normal read barrier instruction sequence>
done:
Undo log filtering in a managed STM works similarly:
lea eax, [obj + #fieldoffset]
/*   or array  elem;  align
properly */ mov ecx, eax
and eax, #tableindexmask
cmp ecx, [#tablebase + eax]   /* reads ephemeral bits */
jeq done
mov [#tablebase + eax], ecx   /* writes ephemeral bits */
<normal read barrier instruction sequence>
done:
```

The embodiments of methods, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical, optical, acoustical or other form of propagated signals (e.g., carrier waves, infrared signals, digital signals); etc.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A non-transient machine readable medium including program code which, when executed by a machine, causes the machine to perform, before executing a transactional memory access operation referencing a data address, the operations of:
loading a value of a hardware monitor associated with metadata, the metadata to be associated with the data address and the value to include at least a resource ID representing at least one of a core or thread that performed a prior access operation referencing the data address during the pendency of the transactional memory access operation and a corresponding state representing whether the prior access operation included a read operation and a write operation;
executing an access barrier operation in response to the value representing a default value, the default value indicating that a memory access to the data address is not a redundant memory access occurring during the pendency of the transactional memory access operation;
accelerating execution of the transactional memory access operation by not executing the access barrier operation in response to the value representing a previously accessed value, the previously accessed value indicating that the memory access is a redundant memory access occurring during the pendency of the transactional memory access operation; and
executing the transactional memory access operation referencing said data address regardless of said value of said hardware monitor.

2. The machine readable medium of claim 1, wherein the transactional memory access operation includes a transactional read within a transaction, the metadata includes a transaction record, the hardware monitor includes a hardware read monitor, and wherein the access barrier operation is selected from a group consisting of logging the transaction record in a read set for the transaction, setting the hardware read monitor to the previously accessed value, and performing on-demand validation for the transactional read.

3. The machine readable medium of claim 2, wherein the program code, when executed by the machine, further causes the machine to perform the operations of:
clearing the hardware read monitor to the default value during a commit of the transaction.

4. The machine readable medium of claim 1, wherein the transactional memory access operation includes a transactional write within a transaction, the metadata includes a transaction record, the hardware monitor includes a hardware write monitor, and wherein the access barrier operation is selected from a group consisting of logging the transaction record in a write set for the transaction, setting the hardware write monitor to the previously accessed value, and acquiring a transactional lock in the transaction record.

5. The machine readable medium of claim 1, wherein the program code includes library code and application code, the library code having an access barrier function including the access barrier operation and the main code having a call to the access barrier function before the transactional access operation, wherein the call to the access barrier function in the application code, when executed, causes the machine to execute the access barrier function included in the library code, the access barrier function, when executed, causes the machine to perform, before executing a transactional memory access operation referencing a data address, the operations of loading the value of the hardware monitor, executing the access barrier operation, and not executing the access barrier operation.

6. A method comprising:
determining a value of a hardware monitor associated with a cache line holding a transaction record for a data object referenced by a transactional read within a transaction, the value including at least a resource ID representing at least one of a core or thread that performed a prior access operation referencing the data object during the pendency of the transaction and a corresponding state representing whether the prior access operation included a read operation and a write operation;

logging the transaction record in a read set associated with the transaction in response to determining the value of the hardware monitor includes a first value, the first value indicating that a transactional read is not a redundant memory access occurring during the pendency of the transaction;

accelerating execution of the transaction by eliding the logging of the transaction record in the read set associated with the transaction in response to determining the value of the hardware monitor includes a second value, the second value indicating that the transactional read is a redundant memory access occurring during the pendency of the transaction; and loading the data object responsive to executing the transaction read irrespective of the value of said hardware monitor.

7. The method of claim 6, further comprising checking that no other transaction owns the transaction record and validating a read set in response to determining the value of the hardware monitor includes the first value; and eliding the checking that no other processing element owns the transaction record and validating the read set in response to determining the value of the hardware monitor includes the second value.

8. The method of claim 6, wherein the hardware monitor includes an attribute bit associated with the cache line.

9. The method of claim 6, wherein the hardware monitor includes a read monitor to track reads to the cache line.

10. The method of claim 6, wherein the data object referenced by the transactional read comprises the transactional read referencing a data address for the data object, and wherein the transaction record for the data object comprises a hash value of the data address for the data object referencing the transaction record.

11. The method of claim 6, further comprising updating the hardware monitor to the second value in response determining the value of the hardware monitor includes the first value.

12. The method of claim 6, wherein a machine readable medium includes program code, which when executed by a machine, is to cause the machine to perform the method of claim 6.

13. A non-transient machine readable medium including program code which, when executed by a machine, causes the machine to perform, before executing a transactional memory access operation referencing a data address, the operations of:

loading a value of an ephemeral filter field associated with metadata, the metadata to be associated with the data address and the value to include at least a resource ID representing at least one of a core or thread that performed a prior access operation referencing the data address during the pendency of the transactional memory access operation and a corresponding state representing whether the prior access operation included a read operation and a write operation;

executing an access barrier operation in response to the value representing a default value, the default value indicating that a memory access to the data address is not a redundant memory access occurring during the pendency of the transactional memory access operation;

accelerating execution of the transactional memory access operation by not executing the access barrier operation in response to the value representing a previously accessed value, the previously accessed value indicating that the memory access is a redundant memory access occurring during the pendency of the transactional memory access operation; and executing the transactional memory access operation regardless of the value of the ephemeral filter field.

14. The machine readable medium of claim 13, wherein the access barrier operation includes a buffered store operation to set the ephemeral filter field to the previously accessed value, and wherein a cache line to hold the ephemeral filter field is to be held in a buffered coherency state in response to executing the buffered store operation.

15. The machine readable medium of claim 14, wherein loading the value of the ephemeral filter field is in response to the machine executing a load operation within the program code.

16. The machine readable medium of claim 13, wherein the transactional memory access operation includes a transactional read within a transaction, the metadata includes a transaction record, the ephemeral filter field is associated with the metadata comprises a cache line holding the ephemeral filter field and the metadata, and wherein the access barrier operation is selected from a group consisting of logging the transaction record in a read set for the transaction, performing a buffered store to update the ephemeral filter field to the previously accessed value, and performing on-demand validation for the transactional read.

17. The machine readable medium of claim 16, wherein the program code, when executed by the machine, further causes the machine to perform the operations of:

executing a buffered store to clear the ephemeral filter field to the default value during a commit of the transaction.

18. The machine readable medium of claim 13, wherein the transactional memory access operation includes a transactional write within a transaction, the metadata includes a transaction record, the ephemeral filter field is associated with the metadata comprises a cache line holding the ephemeral filter field and the metadata, and wherein the access barrier operation is selected from a group consisting of logging the transaction record in a write set for the transaction, performing a buffered store to update the ephemeral filter field to the previously accessed value, and acquiring a transactional lock in the transaction record.

19. The machine readable medium of claim 13, wherein the program code includes library code and application code, the library code having an access barrier function including the access barrier operation and the main code having a call to the access barrier function before the transactional access operation, wherein the call to the access barrier function in the application code, when executed, causes the machine to perform, before executing a transactional memory access operation referencing a data address, the operations of loading the value of the ephemeral filter field, executing the access barrier operation, and not executing the access barrier operation.

20. A method comprising:

before executing a first transactional read within a transaction referencing a first data address for a first data object;

performing a load of a value of an ephemeral filter field, which is to be held with metadata in a cache line, wherein the metadata is to be associated with the first data address and the value is to include at least a resource ID representing at least one of a core or thread that performed a prior access referencing the data address during the pendency of the transaction and a corresponding state representing whether the prior access included a read and a write;

in response to the load of the value of the ephemeral filter field loading an unaccessed value indicating that the transactional read to the first data address is not a redundant memory access occurring during the pendency of the transaction, logging the metadata in a read set for the transaction and performing a buffered store of an accessed value to the ephemeral field, the accessed value indicating that subsequent memory accesses occurring during the pendency of the transaction will be redundant memory accesses; and executing the first transactional read irrespective of the value of the ephemeral filter field;

before executing a second transactional read within the transaction referencing a second data address for a second data object;

performing a subsequent load of the value of the ephemeral filter field, which is to be held with metadata in a cache line, wherein the metadata is also to be associated with the second data address, in response to the load of the value of the ephemeral filter field loading the accessed value, not logging the metadata in a read set for the transaction and not performing the buffered store of the accessed value to the ephemeral field, and executing the second transactional read irrespective of the value of the ephemeral filter field.

21. The method of claim 20, wherein the hardware monitor includes an attribute bit associated with the cache line.

22. The method of claim 20, wherein the metadata includes a transaction record, and wherein the metadata to be associated with the first and also the second data addresses comprises: a hash value of the first data address and a hash value of the second data address is to reference the metadata.

23. An apparatus comprising:

a cache memory including a first cache line to hold a data object referenced by a data address and a second cache line to hold metadata to be associated with the data object, wherein the cache memory is capable of holding the first and second cache lines in a buffered coherency state;

decode logic to decode a first instruction into at least a buffered store operation; and execution logic coupled to the decode logic and the cache memory, the execution logic to execute the buffered store operation to update an ephemeral filter field, which is to be held in the second cache line with the metadata, to an accessed value indicating that subsequent memory accesses occurring during the pendency of a transaction will be redundant memory accesses, the accessed value including at least a resource ID representing at least one of a core or thread that performed a prior access referencing the data object during the pendency of the transaction and a corresponding state representing whether the prior access included a read and a write;

wherein:

the execution logic to execute the buffered store operation is to be in response to the value from the ephemeral filter field being equal to an unaccessed value indicating that a transactional memory operation pending for the data address is not a redundant memory access occurring during the pendency of the transaction;

the decode logic is to decode a second instruction into at least a load operation;

the execution logic is to execute the load operation to load a value from the ephemeral filter field; and the execution logic is to execute the transactional memory operation referencing said data address regardless of the value of said ephemeral filter field value.

24. The method of claim 23, wherein the metadata to be associated with the data object comprises a hash of the data address is to reference the metadata.

25. The method of claim 23, wherein the cache memory is to transition the second cache line to the buffered coherency state in response to the execution logic executing the buffered store operation to update the ephemeral filter field to the accessed value.

26. The method of claim 25, wherein the cache memory is to provide a miss to an external request for the second cache line in response to the second cache line being held in the buffered coherency state, and wherein the cache memory is to provide a hit to a local request for the second cache line in response to the second cache line being held in the buffered coherency state.

27. A non-transient machine readable medium including program code which, when executed by a machine, causes the machine to perform the operations of:

associating a data element with a location to hold ephemeral filtering information for metadata associated with the data element; and filtering a transactional access barrier operation before executing a transactional access operation to the data element based on the ephemeral filtering information for the metadata, said filtering comprising;

loading the ephemeral filtering information for the metadata to obtain a filter value including at least a resource ID representing at least one of a core or thread that performed a prior access referencing the data element during a pendency of a transaction including the transactional access operation and a corresponding state representing whether the prior access included a read and a write;

determining if the filter value indicates the metadata has been previously accessed during the pendency of the transaction including the transactional access operation;

executing the transactional access barrier operation in response to determining the filter value indicates the metadata has not been previously accessed during the pendency of the transaction; and not executing the transactional access barrier operation in response to determining the filter value indicates that subsequent accesses to the metadata will be redundant accesses occurring during the pendency of the transaction; and said program code when executed causes said machine to perform said transactional access operation regardless of whether the filter value indicates the metadata has been previously accessed or has not been previously accessed during pendency of a transaction including the transactional access operations.

28. The machine readable medium of claim 27, wherein the location to hold ephemeral filtering information includes at least a portion of a cache line.

29. The machine readable medium of claim 28, wherein associating the data element with at least the portion of the cache line to hold ephemeral filtering information for metadata associated with the data element comprises storing a reference to at least the portion of the cache line in a header of the data element.

30. The machine readable medium of claim 29, wherein the reference to at least the portion of the cache line in the header of the data element comprises a pointer to at least the portion of the cache line.

31. The machine readable medium of claim 29, wherein the reference to at least the portion of the cache line in the header of the data element comprises an offset of the cache line relative to a base address of the data element.

32. The machine readable medium of claim 28, wherein associating the data element with at least the portion of the cache line to hold ephemeral filtering information for metadata associated with the data element comprises storing a reference to a segment containing the cache line in a header of the data element.

33. The machine readable medium of claim 32, wherein the reference to the segment containing the cache line in the header of the data element comprises an index into the segment containing the cache line in the header of the data element.

34. The machine readable medium of claim 28, wherein associating the data element with at least the portion of the cache line to hold ephemeral filtering information for metadata associated with the data element comprises mapping the data element to at least the portion of the cache line based on address arithmetic with a data address for the data element.

35. The machine readable medium of claim 27, wherein the location to hold ephemeral filtering information for metadata includes a hash table location, and wherein associating a data element with the ephemeral hash table location to hold ephemeral filtering information for metadata associated with the data element comprises mapping the data element to the ephemeral hash table location based on a hash of a data address for the data element.

36. The machine readable medium of claim 27, wherein the transactional access operation includes a transactional read, the metadata includes a transaction record, the transactional barrier operation includes a logging operation to log the transaction record in a read set for the transaction.

37. A method comprising:
associating a data element with a location to hold ephemeral filtering information for metadata associated with the data element;
filtering a transactional access barrier operation before executing a transactional access operation to the data element based on the ephemeral filtering information for the metadata; wherein said filtering comprises:
loading the ephemeral filtering information for the metadata to obtain a filter value including at least a resource ID representing at least one of a core or thread that performed a prior access referencing the data element during a pendency of a transaction including the transactional access operation and a corresponding state representing whether the prior access included a read and a write;
determining if the filter value indicates the metadata has been previously accessed during the pendency of the transaction including the transactional access operation;
executing the transactional access barrier operation in response to determining the filter value indicates the metadata has not been previously accessed during the pendency of the transaction;
not executing the transactional access barrier operation in response to determining the filter value indicates that subsequent accesses to the metadata will be redundant accesses occurring during the pendency of the transaction; and
performing said transactional access operation regardless of the value of said filter value.

38. The method of claim 37, wherein the location to hold ephemeral filtering information includes at least a portion of a cache line.

39. The method of claim 38, wherein associating the data element with at least the portion of the cache line to hold ephemeral filtering information for metadata associated with the data element comprises storing a reference to at least the portion of the cache line in a header of the data element.

40. The method of claim 39, wherein the reference to at least the portion of the cache line in the header of the data element comprises a pointer to at least the portion of the cache line.

41. The method of claim 39, wherein the reference to at least the portion of the cache line in the header of the data element comprises an offset of the cache line relative to a base address of the data element.

42. The method of claim 38, wherein associating the data element with at least the portion of the cache line to hold ephemeral filtering information for metadata associated with the data element comprises storing a reference to a segment containing the cache line in a header of the data element.

43. The method of claim 42, wherein the reference to the segment containing the cache line in the header of the data element comprises an index into the segment containing the cache line in the header of the data element.

44. The method of claim 38, wherein associating the data element with at least the portion of the cache line to hold ephemeral filtering information for metadata associated with the data element comprises mapping the data element to at least the portion of the cache line based on address arithmetic with a data address for the data element.

45. The method of claim 37, wherein the location to hold ephemeral filtering information for metadata includes a hash table location, and wherein associating a data element with the ephemeral hash table location to hold ephemeral filtering information for metadata associated with the data element comprises mapping the data element to the ephemeral hash table location based on a hash of a data address for the data element.

46. The method of claim 37, wherein the transactional access operation includes a transactional read, the metadata includes a transaction record, the transactional barrier operation includes a logging operation to log the transaction record in a read set for the transaction.

47. An apparatus comprising:
means for associating a data element with a location to hold ephemeral filtering information for metadata associated with the data element;
means for filtering a transactional access barrier operation before executing a transactional access operation to the data element based on the ephemeral filtering information for the metadata, said means for filtering comprising:
means for loading the ephemeral filtering information for the metadata to obtain a filter value including at least a resource ID representing at least one of a core or thread that performed a prior access referencing the data element during a pendency of a transaction including the transactional access operation and a corresponding state representing whether the prior access included a read and a write;
means for determining if the filter value indicates the metadata has been previously accessed during the pendency of the transaction including the transactional access operation;
means for executing the transactional access barrier operation in response to determining the filter value indicates the metadata has not been previously accessed during the pendency of the transaction means for not executing the transactional access barrier operation in response to determining the filter value indicates subsequent accesses to the metadata will be redundant accesses occurring during the pendency of the transaction; and means for performing said transactional access operation in response to executing the transactional access barrier operation, in response to not executing the transactional access barrier operation, and irrespective of said filter value.

48. The apparatus of claim 47, wherein the location to hold ephemeral filtering information includes at least a portion of a cache line.

49. The apparatus of claim 48, wherein means for associating the data element with at least the portion of the cache line to hold ephemeral filtering information for metadata associated with the data element comprises means for storing a reference to at least the portion of the cache line in a header of the data element.

50. The apparatus of claim 49, wherein the reference to at least the portion of the cache line in the header of the data element comprises a pointer to at least the portion of the cache line.

51. The apparatus of claim 49, wherein the reference to at least the portion of the cache line in the header of the data element comprises an offset of the cache line relative to a base address of the data element.

52. The apparatus of claim 48, wherein means for associating the data element with at least the portion of the cache line to hold ephemeral filtering information for metadata associated with the data element comprises means for storing a reference to a segment containing the cache line in a header of the data element.

53. The apparatus of claim 52, wherein the reference to the segment containing the cache line in the header of the data element comprises an index into the segment containing the cache line in the header of the data element.

54. The apparatus of claim 48, wherein means for associating the data element with at least the portion of the cache line to hold ephemeral filtering information for metadata associated with the data element comprises means for mapping the data element to at least the portion of the cache line based on address arithmetic with a data address for the data element.

55. The apparatus of claim 47, wherein the location to hold ephemeral filtering information for metadata includes a hash table location, and wherein means for associating a data element with the ephemeral hash table location to hold ephemeral filtering information for metadata associated with the data element comprises means for mapping the data element to the ephemeral hash table location based on a hash of a data address for the data element.

56. The apparatus of claim 47, wherein the transactional access operation includes a transactional read, the metadata includes a transaction record, the transactional barrier operation includes a logging operation to log the transaction record in a read set for the transaction.

* * * * *